United States Patent [19]

Katsuki et al.

[11] Patent Number: 4,955,060

[45] Date of Patent: * Sep. 4, 1990

[54] IMAGE RECOGNITION APPARATUS

[75] Inventors: Kazuo Katsuki, Osaka, Japan; Norman A. Peppers, Belmont, Calif.; James R. Young, Palo Alto, Calif.; Gerald A. Pierce, Redwood City, Calif.; Hisami Nishi, Osaka, Japan

[73] Assignee: Nippon Sheet Glass Co., Ltd., Osaka, Japan

[*] Notice: The portion of the term of this patent subsequent to Dec. 6, 2005 has been disclaimed.

[21] Appl. No.: 69,310

[22] Filed: Jul. 2, 1987

[51] Int. Cl.$^5$ ............................................. G06K 9/00
[52] U.S. Cl. ....................................... 382/32; 382/65; 382/38
[58] Field of Search .................... 382/65, 67, 68, 31, 382/32, 38, 30

[56] References Cited

U.S. PATENT DOCUMENTS

| | | | |
|---|---|---|---|
| 3,074,634 | 7/1963 | Gamo | 382/65 |
| 3,252,140 | 5/1966 | Lemay et al. | 382/32 |
| 3,267,430 | 8/1966 | Howard | 382/32 |
| 3,461,301 | 8/1969 | Fitzmaurice et al. | 382/32 |
| 3,506,837 | 4/1970 | Majima | 382/68 |
| 3,550,119 | 12/1970 | Rabinow | 382/32 |
| 3,764,980 | 10/1973 | Dansac et al. | 382/38 |
| 4,040,009 | 8/1977 | Kadota et al. | 382/38 |
| 4,521,909 | 6/1985 | Wang | 382/38 |

OTHER PUBLICATIONS

Craig et al., Bubble Domain Electronic-to-Optical Image Transducer, IBM Disclosure Bulletin, vol. 13, No. 1, Jun. 1970, pp. 147–148.
Hirsch et al., Character Reader, IBM Disclosure Bulletin, vol. 14, No. 9, Feb. 1972, p. 2590.

Primary Examiner—Leo H. Boudreau
Assistant Examiner—Yon Jung
Attorney, Agent, or Firm—Woodcock Washburn Kurtz Mackiewicz & Norris

[57] ABSTRACT

In an image recognition apparatus for identifying an input image such as a character, any other graphic pattern or the like by comparing the input image with a plurality of reference image, an optical image recognition means simultaneously performs image information detection processing of a plurality of optical pattern images of substantially an identical shape obtained by multiplying the input image, thereby detecting a plurality of image information data corresponding to the plurality of optical pattern images and hence identifies the input image. When the input image cannot be identified by the optical image recognition means, an electronic image recognition means performs digital correlation calculations for limited ones of the reference images according to the above image information data. Therefore, image recognition can be performed by an inexpensive apparatus at high speed, and a high throughput can be obtained. In addition, a high recognition rate can be obtained.

19 Claims, 19 Drawing Sheets

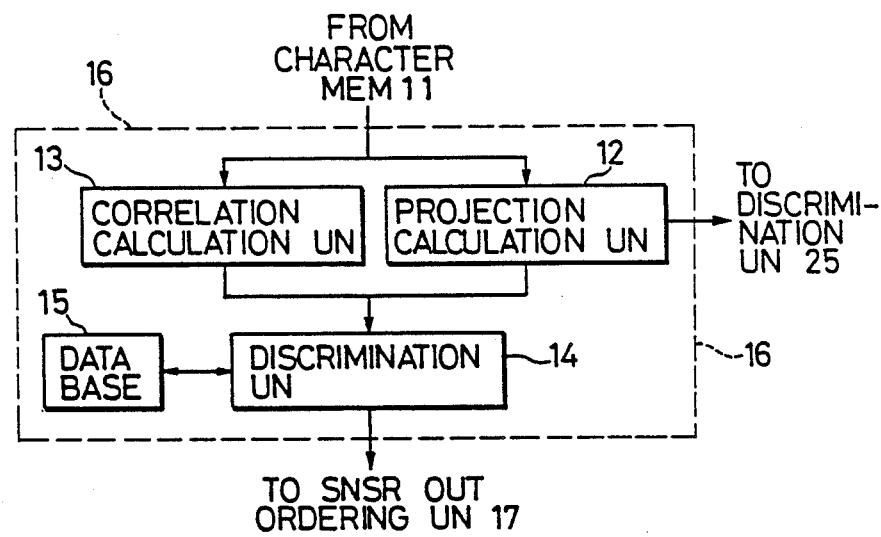
FIG. IA
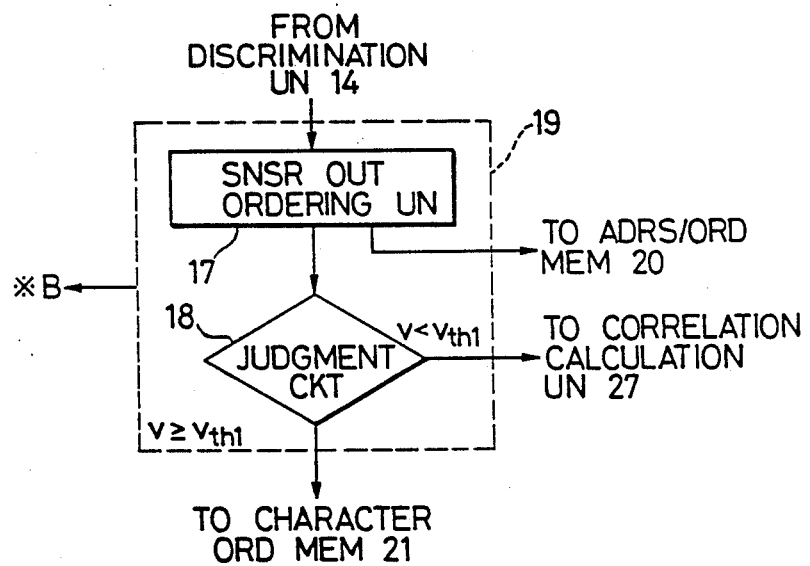
FIG. IB

FIG.22

|   | 15 | 16 |   |
|---|----|----|---|
| 21 | 起 | 軌 |   |
| 22 | 強 | 彊 |   |
|   |   |   |   |

FIG.23

|   | 10 | 11 | 12 | ----- | 20 |
|---|----|----|----|-------|----|
| 1 | 力 | 太 | 玉 | ----- | 本 |
| 2 | 刀 | 大 | 王 | ----- | 木 |
| 3 | 刃 | 犬 | 主 | ----- | 未 |
|   |   |   |   |       |   |

IMAGE RECOGNITION APPARATUS

BACKGROUND OF THE INVENTION

1. Field of the Invention

The present invention relates to an image recognition apparatus for comparing an unknown image (i.e., an input image) such as a character or any other graphic pattern with a large number of reference images and for identifying the input image according to comparison results, the image recognition apparatus being suitable for an OCR (Optical Character Reader).

2. Description of the Prior Art

Generally, in artificial character recognition, images subjected to recognition are characters and other graphic patterns. These images include various types of patterns. For example, characters as images to be recognized include various types of patterns such as Japanese hiragana characters, Japanese katakana characters, Chinese characters, alphabets and figures. In addition, these characters include handwritten characters having irregular styles of penmanship as well as printed characters having regular styles of penmanship, thereby being rich in diversity.

More specifically, in case of Japanese hiragana characters or the like, the number of character is small, and their patterns are relatively simple. However, Japanese hiragana characters include many curved portions and are not suitably recognized in artificial character recognition. Further, referring to Chinese character, each Chinese character has a complicated pattern and the number of Chinese characters for daily use is about 2,000. Besides, the forms of printed Chinese characters include a variety of types such as a Gothic type and a Ming type. Moreover, in recent years, the development of a phototype setting technique allows easy printing of various kinds of types. Therefore, a variety of character forms is increasing. Furthermore, in order to recognize graphic patterns in maps and design drawings in addition to the characters, objects subjected to recognition generally vary.

In order to artificially recognize images having various patterns, preprocessing, class classification (i.e., rough classification), and similarity discrimination are required. Preprocessing is performed for image signals derived from an input image. In class classification, features of the input image are extracted on the basis of the image signals obtained by preprocessing, and a class to which the input image belongs must be determined. In similarity discrimination, correlation calculations such as pattern matching must be performed between the classified input image and reference images belonging to this class, thereby recognizing the input image. Since input images have a variety of patterns as described above, class classification and similarity discrimination are most important in image recognition.

A conventional image recognition apparatus for class classification and similarity discrimination depends on digital processing using primarily an electronic technique. Conventional image recognition techniques will be generally described below.

An input image picked up by an image sensor is subjected to preprocessing such as digital conversion, noise reduction and distortion correction. The preprocessed image is temporarily stored in a memory and then subjected to processing such as normalization for positions, directions, line widths and the like, and classification of the kind of image.

In order to extract features, for example, the memory is addressed as needed to perform serial projection in a large number of axes, thereby extracting global features of the input image. In feature extraction, in order to increase the throughput, it is important to extract effective features even if the number of features to be extracted is small. For this purpose, various types of algorithms are employed to perform feature extraction for a short period of time. The obtained feature data is compared with reference image data stored in a class classification dictionary to discriminate a class to which the input image belongs. This process aims at only class classification, and thus information for ordering candidates of reference characters for recognition cannot be obtained.

After the input image is classified, the input image is pattern-matched with all reference images belonging to this classification and among the reference images stored in the recognition dictionary so as to identify the input image with a given reference image or determine the degree of similarity therebetween. Similarity discrimination based on pattern matching is the basis for correlation calculations. More specifically, correlation functions between the input image and the reference images are sequentially calculated by data processing. The resultant correlation functions are compared with each other to discriminate the degree of similarity between the input image and the reference images.

A large number of correlation calculations are required in digital processing. Therefore, a special machine incorporating a recognition algorithm is developed and used in practice in order to increase the throughput. Parallel calculations are primarily performed in this special machine. However, the calculations are performed by digital processing. The range of objects subjected to correlation calculations is limited to obtain correlation functions and discriminate the degree of similarity due to time limitations.

Furthermore, in the above special machine, in order to achieve a high throughput or the like, a recognition algorithm has been improved, and an architecture of the special machine including a special LSI has been developed.

In the conventional techniques described above, however, the following problems are presented.

In each processing of class classification and similarity discrimination of the input image, the input image data stored in the memory are sequentially addressed to perform time-serial digital processing, thus prolonging the processing time. In particular, in the time-consuming similarity discrimination process, if the special machine incorporating the above-mentioned special algorithm is used, the total processing time can be shortened. However, even the special machine is primarily operated by digital processing. As a result, a satisfactory solution for the above problems cannot be proposed.

When the special machine is used, since the special architectural design is required to incorporate the special algorithm in the machine, there is a problem that machine cost comes to be high. In addition, since a large number of calculations are required in correlation calculations, the range of objects subjected to correlation calculations must be limited due to time limitations even if the special machine is used, thereby causing another problem that precision of similarity discrimination is decreased. If current circumstances are taken into consideration wherein pattern matching is performed by a single-stage correlation calculation unit, the precision of similarity discrimination is further decreased.

The decrease of precision of similarity discrimination causes a decrease in recognition rate of the apparatus together with a tendency for extracting particular features due to difficulty in digital processing of extracting nonlinear features (e.g., circumferential and radial projections) in class classifications.

SUMMARY OF THE INVENTION

It is, therefore, a principal object of the present invention to provide an image recognition apparatus capable of achieving a high processing speed and a high recognition rate.

It is another object of the present invention to provide an inexpensive image recognition apparatus.

It is still another object of the present invention to provide an image recognition apparatus using both highly efficient optical image recognition processing and high-precision electronic image recognition processing.

In order to achieve the above objects of the present invention, there is provided an image recognition apparatus comprising optical image recognizing means for performing image recognition processing including an optical process and electronic image recognizing means for performing electronic digital processing, the optical image recognizing means being arranged to optically multiply an input image such as a character, any other graphic pattern or the like to be recognized to form a plurality of optical pattern images of substantially an identical shape, to simultaneously perform at least one of image information detecting processes such as projection feature extraction processing, primitive pattern extraction processing, optical correlation calculation processing according to optical pattern matching or the like, thereby detecting a plurality of image information data corresponding to the plurality of optical pattern images, and to identify the input image on the basis of the plurality of image information data, the electronic image recognizing means being arranged to perform digital correlation calculations between the digital pattern data of the input image and digital pattern data of a plurality of reference images and to identify the input image, wherein the digital correlation calculations by the electronic image recognizing means are performed for limited ones of the reference images according to the image information data obtained by the optical image recognizing means when the input image cannot be identified on the basis of the image information data.

In the image recognition apparatus of the present invention having the above arrangement, the optical image recognizing means simultaneously performs image information detection processing of the plurality of optical pattern images of substantially an identical shape obtained by multiplying the input image, thereby detecting the plurality of image information data corresponding to the plurality of optical pattern images and hence identifying the input image. In the electronic image recognizing means, the input image that cannot be identified by the optical image recognition processing is subjected to digital correlation calculations between the digital pattern data of the input image and the digital pattern data of the reference images the number of which is limited according to the image information data.

BRIEF DESCRIPTION OF THE DRAWINGS

FIG. 1A is a block diagram of a primary recognized data output unit shown in FIG. 1;

FIG. 1B is a block diagram of a primary recognition judgment processor shown in FIG. 1;

FIG. 22 is a view showing a main part for explaining a look-up table shown in FIG. 1C; and FIG. 23 is a view showing a main part for explaining a look-up table for similar characters shown in FIG. 1.

DETAILED DESCRIPTION OF THE PREFERRED EMBODIMENTS

An image recognition apparatus for recognizing characters according to an embodiment of the present invention will be described hereinafter.

I: General Description of Image Recognition Apparatus (FIGS. 1, 1A and 1D)

Figure 1:
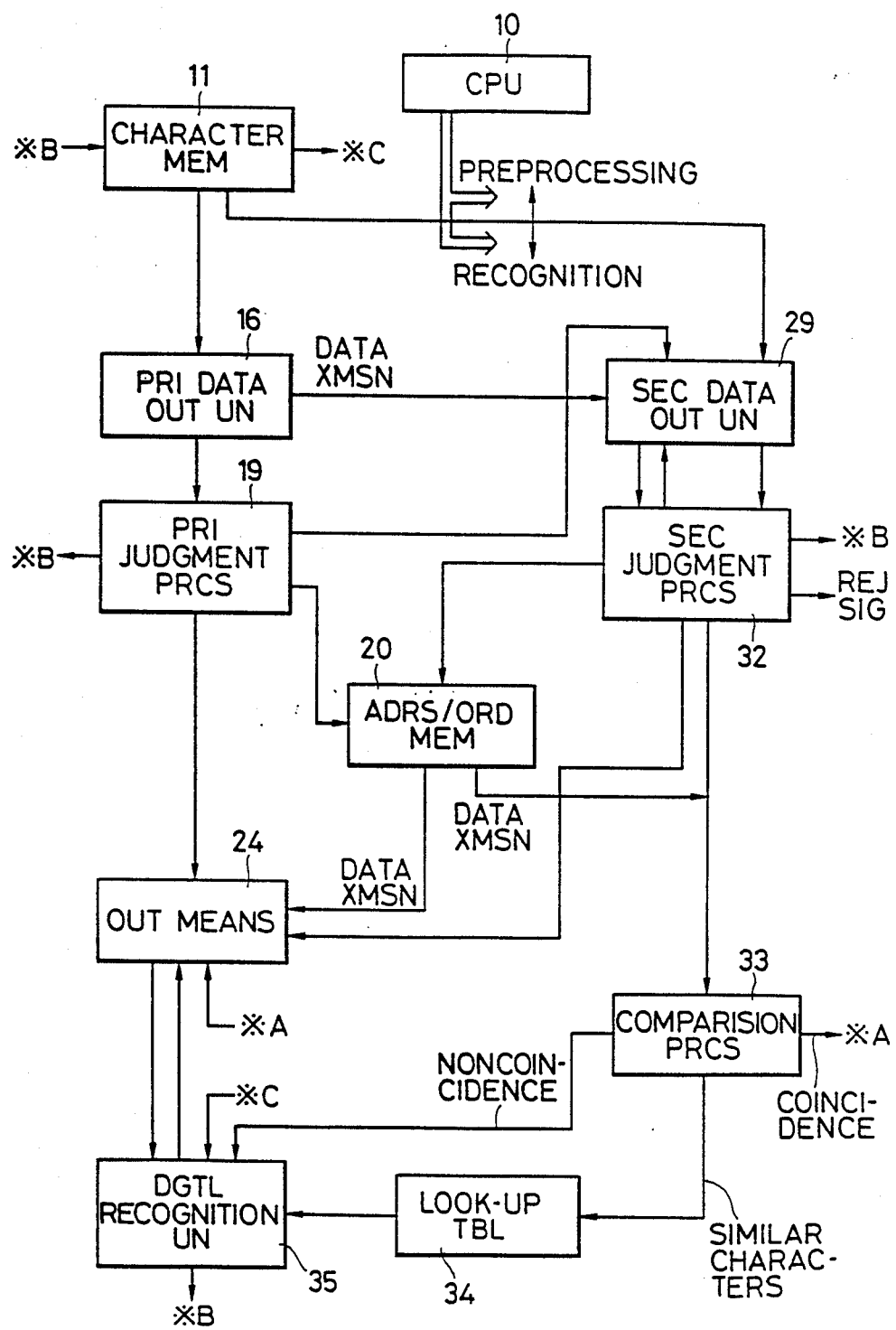
FIG. 1 is a block diagram of an image recognition apparatus according to an embodiment of the present invention.

The image recognition apparatus shown in FIG. 1 comprises a main processor 10 composed of a CPU, an isolated character memory 11 for storing normalized input image (input character) data, an optical image recognizing means for performing image recognition processing including an optical process, an electronic image recognizing means for performing digital correlation calculations between digital pattern data of the input image and those of a large number of reference characters, and a means 24 for outputting recognized characters.

The main processor 10 controls the respective components of the image recognition apparatus shown in FIG. 1. These components include an image scanner (not shown) for converting into electrical signals density information of objects subjected to image recognition, i.e., manuscripts printed documents, a page classification device (not shown) for classifying pages, a line and character classification device (not shown) for classifying lines and characters in units of pages, and a preprocessing means (not shown) for performing processing, such as noise reduction or normalization for positions, inclinations and line widths, of the image signals derived from input characters extracted by individual classification.

The optical image recognizing means comprises a primary image recognizing means, a secondary image recognizing means for identifying the input image on the basis of image information data different from the image information data of the primary image recognizing means, a supplementary image recognizing means for reinforcing the functions of the primary and secondary image recognizing means, and a recognized character address/order memory 20. The primary image recognizing means comprises a primary data output unit 16 and a primary recognition judgment processor 19. The secondary image recognizing means comprises a secondary recognized data output unit 29 and a secondary recognition judgment processor 32. The supplementary image recognizing means comprises a character order comparison processor 33. The electronic image recognizing means comprises a look-up table 34 for similar characters and an auxiliary digital recognition unit 35 having the same arrangement as the conventional image recognition apparatus depending on digital processing utilizing an electronic technique.

As shown in FIG. 1A, the primary recognized data output unit 16 comprises a projection calculation unit 12 for extracting projection features of an input image, a first optical correlation calculation unit 13 for extracting primitive patterns (i.e., local features of the input image) included in the input image, a first vector discrimination unit 14 for comparing the features extracted by the units 12 and 13 with predetermined reference image data, and a data base 15 for transferring reference image data to the discrimination unit 14. As shown in FIG. 1D, the secondary recognized data output unit 29 comprises a second vector discrimination unit 25 for comparing the projection feature data from the projection calculation unit 12 with predetermined reference image data, a data base 26 for transferring the reference image data to the discrimination unit 25, a second optical correlation calculation unit 27 for optically matching input image patterns with reference image patterns so as to calculate correlation functions therebetween (i.e., character correlation calculations), and a data base 28 for transferring the reference image data to the calculation unit 27.

II: Projection Calculation Unit (FIGS. 4 to 9)

The projection calculation unit 12, the first and second optical correlation calculation units 13 and 27, and the first and second vector discrimination units 14 and 25, all of which serve as the main components of the image recognition apparatus, will be described below.

Figure 4:
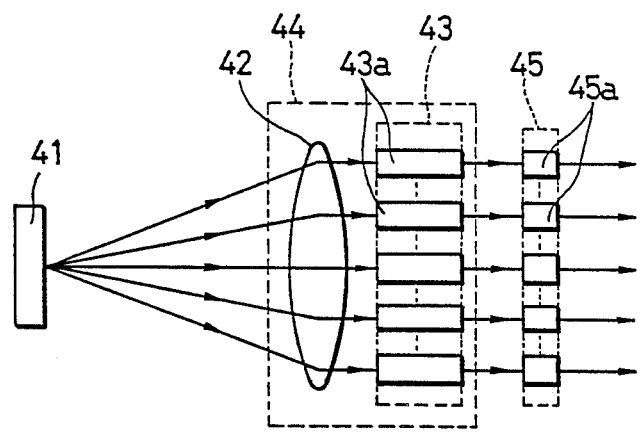
FIG. 4 is a schematic diagram of a projection calculation unit shown in FIG. 1A.

The projection calculation unit 12 shown in FIG. 1A performs optical projection processing of input characters to extract global features and local features (if required) of the input character patterns. The general arrangement of the projection calculation unit 12 is shown in FIG. 4.

At first, in response to a command from the main processor 10, input character data stored in the isolated character memory 11 is transferred to a display 41 and displayed as an optical image on the screen of the display 41. Next, the image on the screen is guided to a lens array 43 through a projection lens 42 spaced apart from the display 41 by a focal length of the lens 42.

A photosensor array 45 having a large number of projection photosensors 45a is arranged in front of the lens array 43. And the lens array 43 comprises image formation lenses 43a located at positions respectively corresponding to the photosensors 45a. The optical image having substantially the same shape as that displayed on the screen of the display 41 is multiplied and formed on the respective light-receiving surfaces of the photosensors 45a by these image formation lenses 43a. Besides, the lens array 43 may comprise a planar microlens having microlenses (e.g., gradient index lenses) in a plate made of a glass, a synthetic resin or the like. In this case, the number of microlenses such as gradient index lenses may be the same as that of the photosensors 45a. An SLA (tradename) available from Nippon Sheet Glass Co., Ltd. may be used as the lens array 43. The SLA is obtained by bundling cylindrical gradient index lenses, the number of which may be the same as that of photosensors 45a. In this case, a resin is filled between the cylindrical gradient index lenses such that they are located at the positions corresponding to the image formation lenses 43a.

The projection lens 42 and the lens array 43 constitute the multiplier 44 for optically multiplying an input character image. An image on the screen of the display 41 guided onto the lens array 43 through the projection lens 42 is multiplied and focused by the image formation lenses 43a of the lens array 43. The multiple images are simultaneously and respectively formed on the light-receiving surfaces of the projection photosensors 45a of the photosensor array 45. Besides, the number of projection photosensors 45a is appropriately determined according to the number of types of projection features to be extracted. The number of image formation lenses 43a is also determined according to the number of types of projection features to be extracted.

Next, electrical signals corresponding to the intensity distribution curves having specific projection features of images (namely optical pattern images) formed on the light-receiving surfaces of the projection photosensors 45a are output respectively from the photosensors 45a in a manner to be described later.

Now, various arrangements of a photosensor serving as the projection photosensors 45a shown in FIG. 4 so as to extract global features will be described with reference to FIGS. 5A to 9C. FIGS. 5A to 9C exemplify a case wherein Chinese character "凸" is displayed on the screen of the display 41. Therefore, Chinese character "凸" is also formed on the light-receiving surface of each photosensor 45a.

Figure 5A:
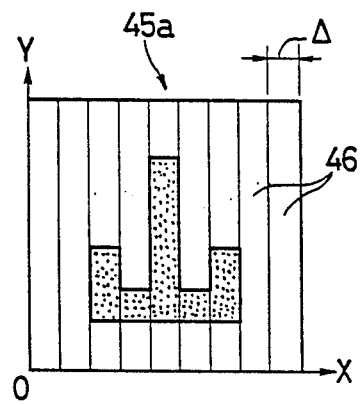
FIG. 5A is a front view of an X-axis projection photosensor used in the projection calculation unit shown in FIG. 4.
Figure 5B:
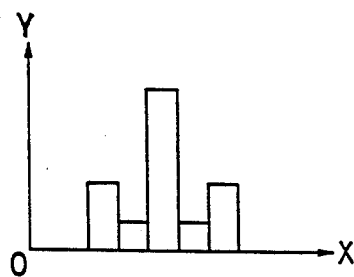
FIG. 5B is a graph showing an intensity distribution curve obtained from the X-axis projection photosensor shown in FIG. 5A.

The photosensor 45a shown in FIG. 5A is designed to project an image on the X-axis. The photosensor 45a consists of a large number of photosensor elements 46 (9 elements in FIG. 5A) each having a stripe-like light-receiving surface of a width Δ. The photosensor elements 46 are aligned such that the sides thereof are adjacent to each other. The photosensor elements 46 constitute a substantially square light-receiving surface as a whole. Electrical signals corresponding to the projection features are output from the photosensor elements 46 according to the shape of the image formed on the light-receiving surface of the photosensor 45a. The intensity distribution curve along the X-axis, as shown in FIG. 5B, can be obtained from these electrical signals.

Figure 6:
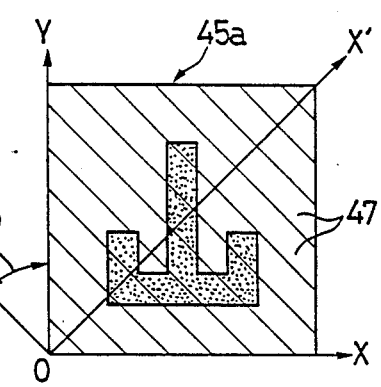
FIG. 6 is a front view of an X'-axis projection photosensor used in the projection calculation unit shown in FIG. 4.

The photosensor 45a shown in FIG. 6 has a pattern obtained by rotating the photosensor pattern of FIG. 5A through any angle θ about the origin. The photosensor 45a shown in FIG. 6 consists of a large number of photosensor elements 47 each having a stripe-like light-receiving surface having a width Δ in the same manner as in the photosensor of FIG. 5A. Therefore, the photosensor 45a in FIG. 6 is designed to project an image on the X'-axis obtained by rotating the X-axis through an angle θ. In this case, three types of photosensors each having an angle θ of 45°, 90° and 135° can be used. However, the angle θ may vary as needed.

For the construction of the photosensor for performing linear projection described above, the following modification may be made. For example, in the X-axis projection photosensor shown in FIG. 5A, the photosensor elements 46 may be arranged on half portion divided by a horizontal or vertical bisector. In the X'-axis projection photosensor shown in FIG. 6, the photosensor elements 47 may be arranged in one triangular portion divided by one of the diagonal lines. In these cases, the area of the light-receiving surface is reduced to ½, thereby extracting local features by projections of multiple images.

Figure 7:
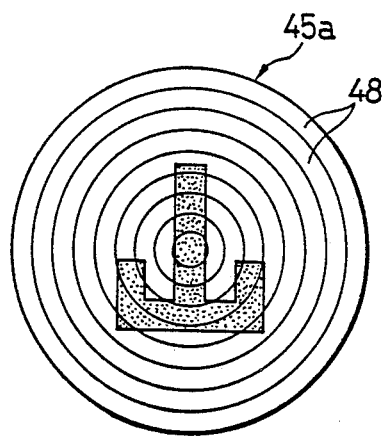
FIG. 7 is a front view of a circumferential projection photosensor used in the projection calculation unit shown in FIG. 4.
Figure 8:
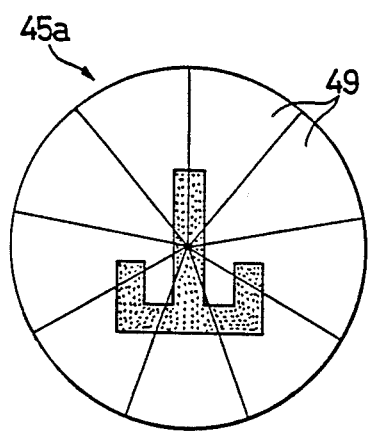
FIG. 8 is a front view of a radial projection photosensor used in the projection calculation unit shown in FIG. 4.

Photosensors 45a shown in FIGS. 7 and 8 are designed to perform nonlinear projection. More specifically, the photosensor 45a in FIG. 7 is designed to perform circumferential projection and consists of a large number of concentric photosensor elements 48 (9 elements in this case). The central photosensor element 48 has a circular light-receiving surface having a small diameter. The remaining photosensor elements 48 are ring-like light-receiving surfaces having different diameters but substantially the same width. The width of these peripheral photosensor elements 48 is substantially the same as the radius of the central photosensor element 48. The photosensor elements 48 are arranged such that the outer circumference of an inner unit serves as the inner circumference of an outer unit adjacent thereto. The photosensor elements 48 constitute a circle as a whole. In this photosensor, even if an image to be formed on the light-receiving surface is rotated, the intensity distribution curve free from the influence of rotation can be obtained. Therefore, projection features free from the influences of rotation can be extracted from an image.

A photosensor 45a shown in FIG. 8 is designed to perform radial projection and consists of a large number of photosensor elements 49 (9 elements in this case) having substantially sector-shaped and identically-shaped light-receiving surfaces. The photosensor elements 49 are arranged around one point such that vertices of the central angles of the units 49 come together at the one point. In this state, the sides (radii) of the adjacent light-receiving surfaces are adjacent to each other to constitute a substantially circular light-receiving surface as a whole. In this sensor 45a, even if an image focused on the light-receiving surface is deviated from the center, such a deviation does not influence the intensity distribution curve excessively. Therefore, projection features free within the limited deviation from errors caused by the deviation of the image from the center can be extracted.

In each of the photosensors 45a shown in FIGS. 5A to 8, a large number of photosensor elements 46 to 49 can be two-dimensionally arranged on a common substrate.

Figure 9A:
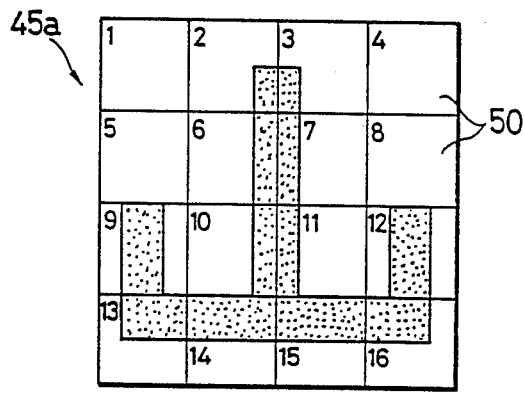
FIG. 9A is a front view of a matrix projection photosensor used in the projection calculation unit shown in FIG. 4.

FIG. 9A shows a matrix projection photosensor 45a. Photosensor elements 50 having square light-receiving surfaces are arranged in a matrix form (16 elements in this case). These photosensor elements 50 are adjacent to each other such that sides thereof are in contact with each other to constitute a square light-receiving surface as a whole. The photosensor elements 50 are imaginarily assigned with elements No. 1 to No. 16 for illustrative convenience.

Figure 9B:
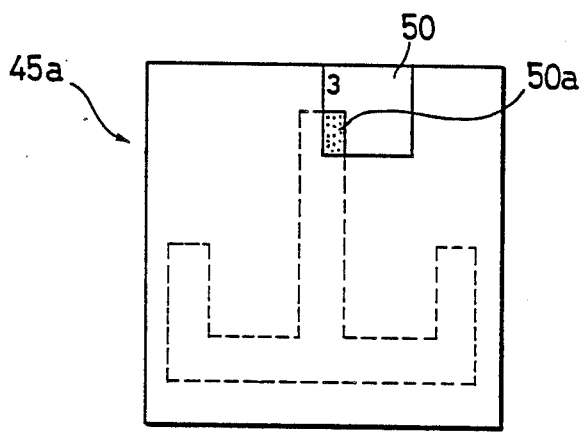
FIGS. 9B and 9C are schematic front views of the matrix projection photosensor of FIG. 9A to explain the function of the photosensor elements.
Figure 9C:
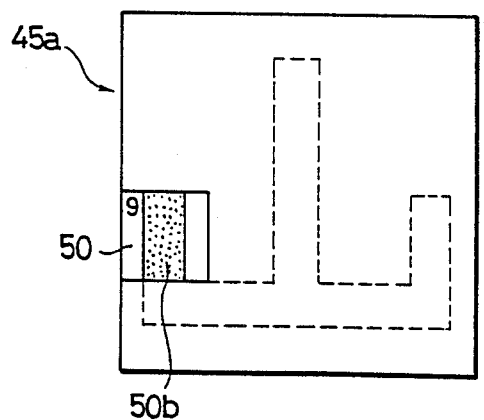

The photosensor elements 50 are designed to project an input image on one axis, e.g., the X-axis. For this reason, the photosensor elements 50 generate sensor outputs corresponding to the light intensities of constituting parts of the image formed on the light-receiving surface. For example, a right portion 50a of the upper end of the image of Chinese character "山" is detected by the photosensor element No. 3 (FIG. 9B). An upper portion 50b of the left end of the image of Chinese character "山" is detected by the photosensor element No. 9 (FIG. 9C).

Therefore, according to this photosensor, the global features of the image patterns of the input image, that is, projection features according to the two-dimensional distribution, can be extracted.

The matrix projection photosensor may be formed such that the photosensor elements 50 are arranged on a common substrate in a matrix form. Alternatively, a plurality of 1-dimensional photosensor arrays (an array consisting of photosensor elements No. 1 to 4) may be combined and formed on the common substrate. In the former arrangement, the sensor outputs can be obtained by performing 2-dimensional output control. In the latter case, the sensor outputs can be obtained by performing simultaneous output control for the plurality of 1-dimensional photosensor arrays.

The outputs from the photosensors 45a shown in FIGS. 5A to 9C are normalized with reference to the outputs corresponding to total amounts of light received by the photosensor elements 46 to 50.

As is apparent from the above description, the photosensor array 45 includes various types of projection photosensors 45a. For example, the array 45 includes one X-axis projection photosensor shown in FIG. 5A, three X'-axis projection photosensors having $\theta = 45°$, 90° and 135°, as shown in FIG. 6, one circumferential projection photosensor shown in FIG. 7, one radial projection photosensor and one matrix projection photosensor shown in FIG. 9A, i.e., a total of seven projection photosensors. The light-receiving surface of each of these photosensors 45a consists of a large number of photosensor elements 46, 47, 48, 49 or 50. Therefore, in this case, seven intensity distribution curves having various projection features can be obtained from the electrical signals generated by these photosensor elements 46 to 50.

According to the projection calculation unit 12 described above, after the input character image is displayed on the screen of the display 41, a plurality of optical images of substantially an identical shape are simultaneously formed on the plurality of projection photosensors 45a by the multiplier 44 consisting of the projection lens 42 and the lens array 43 at a light propagation speed. By projection processing of the projection photosensors 45a, various types of projection features (intensity distributions) can be simultaneously obtained.

III: First and Second Vector Discrimination Units (FIGS. 10 to 15)

Among the electrical signals constituting the various types of projection features inherent to the input character, the electrical signals output from the projection photosensors 45a shown in FIGS. 5A to 8 together with electrical signals corresponding to the primitive features, i.e., the local features from the first optical correlation calculation unit 13 shown in FIG. 1A are supplied to the first vector discrimination unit 14 shown in FIG. 1A. The electrical signals output from the matrix projection photosensor 45a shown in FIGS. 9A-9C are transferred to the second vector discrimination unit 25 shown in FIG. 1D. Images corresponding to vectors representing the projection features (i.e., the global features) and the local features are displayed on the screens of the vector displays 61 (FIG. 10) of the first and second vector discrimination units 14 and 25, respectively, as is mentioned in the latter.

The vector discrimination units 14 and 25 perform correlation calculations between the vector representing the features of the input character and vectors of a large number of reference characters according to optical pattern matching. For the sake of simplicity, only the first vector discrimination unit 14 will be described below with the projection features limited to the intensity distributions obtained by projections on the X- and Y-axes. However, the second vector discrimination unit 25 has the same arrangement as that of the first vector discrimination unit 14 except that the shapes of the reference patterns formed on the reference masks 65a are different from those of the first vector discrimination unit.

Figure 10:
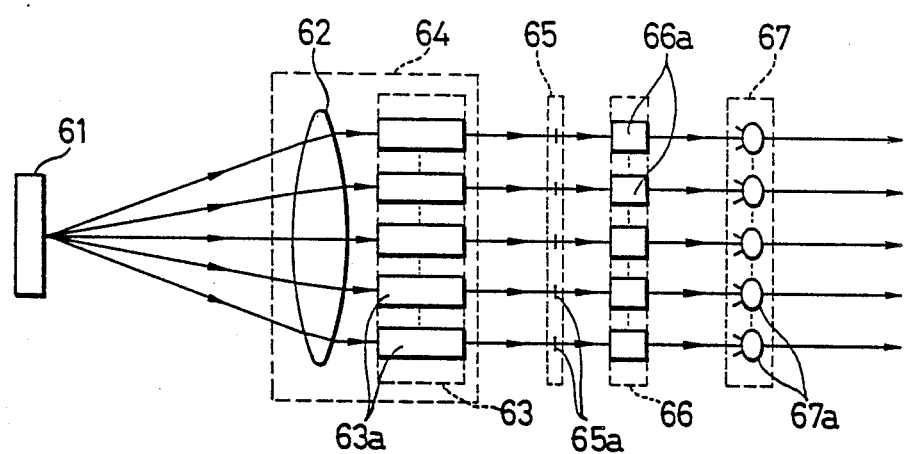
FIG. 10 is a schematic view of a first vector discrimination unit shown in FIG. 1A.
Figure 11:
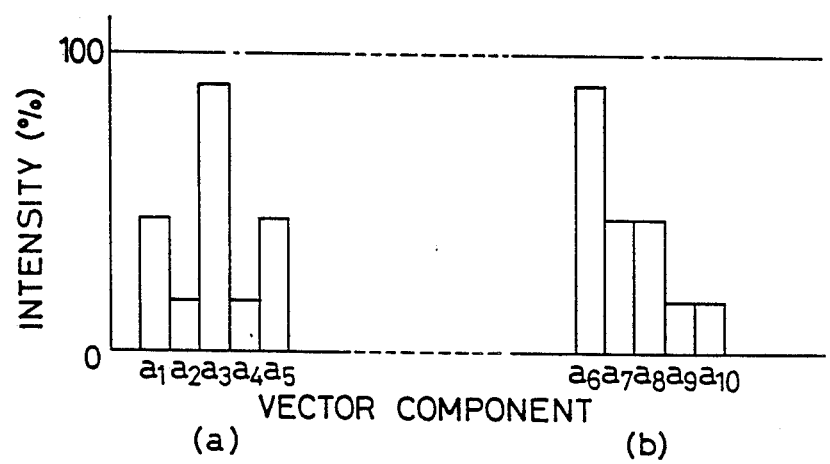
FIG. 11 is a graph showing an intensity distribution curve obtained by projections in the X-and and X'-axes in the photosensors shown in FIGS. 5A and 6.

FIG. 11 shows an X-axis projection intensity distribution curve (a) and a Y-axis projection intensity distribution curve (b), both of which are obtained by extracting the features from Chinese character "山". In this case, the vector corresponding to the projection features of Chinese character "山" consists of five vector components $a_1$ to $a_5$ corresponding to the X-axis projection data and five vector components $a_6$ to $a_{10}$ corresponding to the Y-axis projection data. These ten vector components are displayed as bright line patterns on the display 61 shown in FIG. 10.

Figure 14:
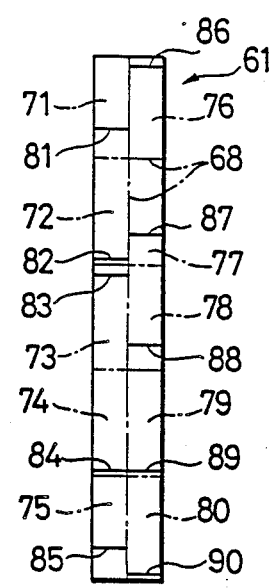
FIG. 14 is a front view of the display (FIG. 10) showing a state wherein a bright line pattern group representing features of Chinese character "山" is formed.
Figure 15:
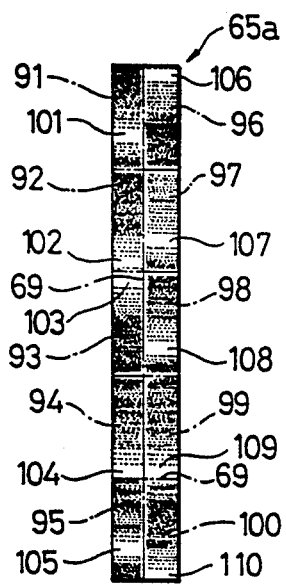
FIG. 15 is a front view of a reference mask (FIG. 10) having a reference pattern group corresponding to the bright line pattern representing the features of Chinese character "山"

Vertices of the intensity distribution curves (a) and (b) in FIG. 11, which are obtained by X- and Y-axis projection, are displayed as a large number of bright line patterns on the display 61 of FIG. 10. For this reason, the display screen of the display 61 is assigned into the predetermined number of rectangular areas 71 to 80 corresponding to the vector components $a_1$ to $a_{10}$, as indicated by imaginary chain lines 68 in FIGS. 13 and 14. As shown in FIG. 14, the vector components are respectively displayed as bright lines 81 to 90 at level positions proportional to the size of the vectors in the areas 71 to 80.

Besides, FIG. 14 shows a state wherein ten projection data of Chinese character "山" shown in FIG. 11 are displayed on the display 61. The ten projection data are transformed into a 10-dimensional vector. The relative size, i.e., rating values, of the vector components $a_1$ to $a_{10}$ are shown in Table 1. The vector components $a_1$ to $a_{10}$ are displayed as the bright lines 81 to 90 at positions corresponding to the rating values in the areas 71 to 80 in the display 61, the areas 71 to 80 being designed to correspond to the vector components $a_1$ to $a_{10}$, respectively.

TABLE 1

| Projection Data No. | Rating Value of Vector Component |
|---|---|
| 1 | 0.3 |
| 2 | 0.05 |
| 3 | 0.9 |
| 4 | 0.05 |
| 5 | 0.3 |
| 6 | 0.9 |
| 7 | 0.3 |
| 8 | 0.3 |

TABLE 1-continued

| Projection Data No. | Rating Value of Vector Component |
|---|---|
| 9 | 0.05 |
| 10 | 0.05 |

The vector discrimination unit shown in FIG. 10 will be described in more detail. A projection lens 62 is spaced apart from the front surface of the display 61 by a focal length of the projection lens 62. Beams from the bright line patterns 81 to 90 displayed on the display screen of the display 61 are collimated by the projection lens 62. The collimated beams are guided to a mask array 65 through a first lens array 63.

The mask array 65 comprises a large number of reference masks 65a substantially located on a single plane. The first lens array 63 comprises image formation lenses 63a at positions respectively corresponding to the reference masks 65a. The first lens array 63 may comprise a planar microlens or an SLA in the same manner as the lens array 43.

The projection lens 62 and the first lens array 63 constitute the multiplier 64 for optically multiplying the bright line pattern group consisting of the bright line patterns 81 to 90 displayed on the vector display 61. The bright line pattern group displayed on the display screen of the display 61 and guided on the first lens array 63 through the projection lens 62 is simultaneously and respectively formed on the reference masks 65a of the mask array 65 by the image formation lenses 63a of the lens array 63. The reference masks 65a are respectively assigned to the predetermined number of rectangular areas 91 to 100 corresponding to the areas 71 to 80 of the display 61, as indicated by the imaginary chain line 69 in FIG. 15. Reference patterns 101 to 111 having the same lightness polarity as that of the bright line patterns 81 to 90 are formed in the areas 91 to 100, respectively. The areas 91 to 100 of the reference mask 65a may have the same size as or similar figures having different size from that of the areas 71 to 80 of the display 61. In any event, it is essential that the areas 71 to 80 of the display 61 are focused or projected by the multiplier 64 in the areas 91 to 100 of the reference mask 65a in one-to-one correspondence.

Various kinds of reference masks 65a, the number of which corresponds to the number required for discrimination operations such as class classification and recognition, are used in this apparatus. The reference masks 65a shown in FIG. 15 respectively have the reference patterns 101 to 110 corresponding to the bright line patterns 81 to 90 of Chinese character "山" shown in FIG. 14 and are used to recognize Chinese character "山".

The reference pattern group consisting of the reference patterns 101 to 110 of the reference masks 65a is obtained by patterning the projection features of reference characters so as to correspond to vectors. In this case, the reference characters are stored in a look-up table (graphic/character pattern code table) 22 (to be described later). One-to-one correspondence is established between the addresses of the reference characters stored in the look-up table 22 and the positions (addresses) of the reference masks 65a of the mask array 65.

These reference masks 65a may be constituted as variable masks by a spatial modulation element using a liquid crystal as a display medium. In this case, reference data corresponding to the reference patterns are digitally stored in the data base 15 (FIG. 1A) for each reference masks 65a. The reference data is transferred from the data base 15 to the spatial modulation element as needed. A plurality of reference patterns corresponding to the reference image data are formed by the spatial modulation elements. For this reason, the scale of the optical systems of the vector discrimination units 14 and 25 can be reduced.

The reference masks 65a may comprise fixed masks. The fixed masks have reference pattern groups consisting of the reference patterns 101 to 110 of predetermined shapes which are not changed to other shapes.

The reference patterns 101 to 110 of the reference masks 65a serve as a gray scale because the concept of so-called "blurring" is introduced. A character to be discriminated has many styles in a printed one and a positional error often occurs in the case of a handwritten Chinese character. Unless the reference patterns 101 to 110 of the reference masks 65a serve as the gray scale, it is difficult to establish pattern matching between the bright line patterns 81 to 90 corresponding to the character to be discriminated and the reference patterns 101 to 110 of the reference masks 65a corresponding to the character. However, in this embodiment, since the reference patterns constitute the gray scale, pattern matching adaptive for styles of characters and positional errors to some extent can be performed.

The bright line pattern group consisting of the bright line patterns 81 to 90 displayed on the display 61 is focused on various types of reference masks 65a by the multiplier 64. In this case, image formation is performed such that one-to-one correspondence between the areas 71 to 80 of the display 61 and the areas 91 to 100 of the reference mask 65a is established. The beams passing through the reference masks 65a are focused by a large number of condenser lens 66a of a second lens array 66, which are located in one-to-one correspondence with the reference masks 65a. The focused beams are then guided onto a photosensor array 67. The second lens array 66 may be a planar microlens or an SLA having the same arrangement as that of the first lens array 43.

The photosensor array 67 comprises a large number of photosensors 67a arranged in one-to-one correspondence with the condenser lenses 66a and located in the vicinities of the condensing points of the condenser lenses 66a. The beams passing through the reference masks 65a are focused by the condenser lenses 66a, and the intensities of these beams are detected by the photosensors 67a, respectively.

Outputs from the photosensors 67a are rated for each reference mask 65a according to the maximum intensity of the beam passing through the reference masks 65a in order to make image discrimination easy. Then, the levels of the rated outputs are compared with predetermined threshold value in the primary recognition judgment processor 19 (to be described later), to perform the ordering of the recognition candidate characters.

In the vector discrimination unit 14 having the above arrangement, after the bright line patterns 81 to 90 obtained by representing the projection data as vector components are displayed on the vector display 61, multiplication of the bright line pattern group, optical matching between the multiplied bright line pattern group and the reference pattern groups consisting of the reference patterns 101 to 110 of the plurality of reference masks 65a, and condensing of the beams passing through the reference masks 65a by means of the condenser lens 66a can be performed at a light propagation speed. The condensed beams can be simultaneously detected by the large number of photosensors 67a in a short response time.

Figure 12:
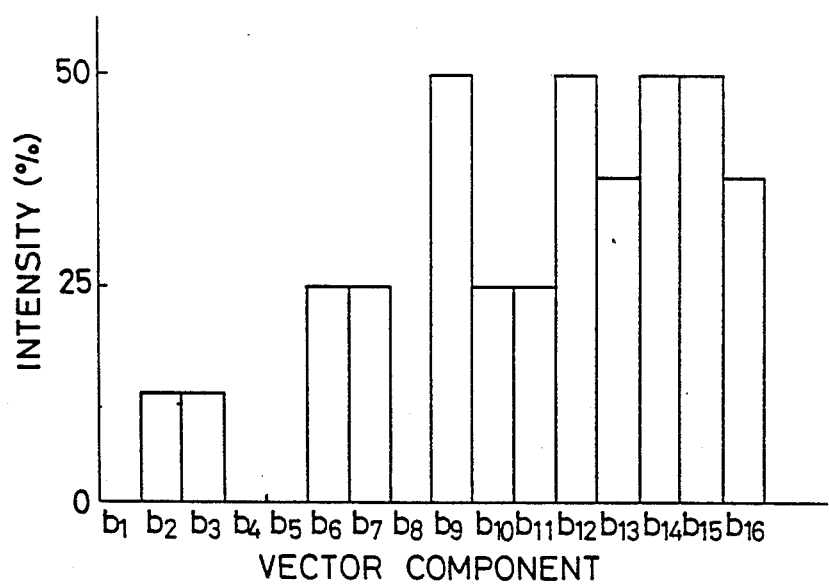
FIG. 12 is a graph showing an intensity distribution curve obtained by matrix projection in the photosensor shown in FIG. 9A.
Figure 13:
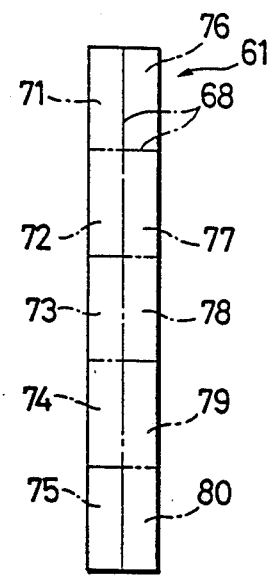
FIG. 13 is a front view of a display showing display areas (FIG. 10) respectively assigned to vector components corresponding to projection data of the intensity distribution shown in FIG. 11.

If a satisfactorily normalized sensor output cannot be obtained as a result of pattern matching in the first vector discrimination unit 14, secondary character recognition processing primarily concentrated on optical correlation calculations by optical pattern matching is performed by the secondary image recognizing means as described later. The second vector discrimination unit 25 in the secondary image recognizing means has, as described previously, the same arrangement as that of the first vector discrimination unit 14 except that the shapes of the reference pattern groups formed in the reference masks 65a are different from those in the first vector discrimination unit 14. The vector representing projection data or the like input to the second vector discrimination unit 25 exhibits an intensity distribution of features extracted from the character, and an example is shown in FIG. 12.

More specifically, a 16-dimensional vector (FIG. 12) output from the matrix projection photosensor 45a (FIG. 9) in the projection calculation unit 12 is represented by the same intensity distribution curve as that shown in FIG. 11. The 16-dimensional vector represents an intensity distribution curve extracted from input Chinese character "凸" by matrix projection. Sixteen vector components $b_1$ to $b_{16}$ are displayed as sixteen bright line patterns on the vector display, respectively, in the same manner as in FIG. 14. As described above, the bright line pattern group can be matched with the reference pattern group formed on the reference mask.

Processing by the second vector discrimination unit 25 aims at performing rough classification of the characters. By combining this processing with optical correlation calculation processing by the second optical correlation calculation unit 27, the recognition rate can be increased and the recognition time can be shortened.

IV: First and Second Optical Correlation Calculation Units (FIGS. 16 to 21)

The first optical correlation calculation unit 13 shown in FIG. 1A and the second optical correlation calculation unit 27 shown in FIG. 1D will be described below. The first optical correlation calculation unit 13 aims at extracting primitive patterns, i.e., local features included in the input character. The second optical correlation calculation unit 27 aims at performing correlation calculations between the input character patterns and the reference character patterns according to optical pattern matching. The arrangements of the first and second optical correlation calculation units 13 and 27 are substantially identical except that the patterns formed in reference masks 126a are different from those in the first optical correlation calculation unit 13. Therefore, the second optical correlation calculation unit 27 will be described in detail with reference to FIGS. 16 to 18, and then the first optical correlation calculation unit 13 will be described with reference to FIGS. 19 to 21.

Figure 16:
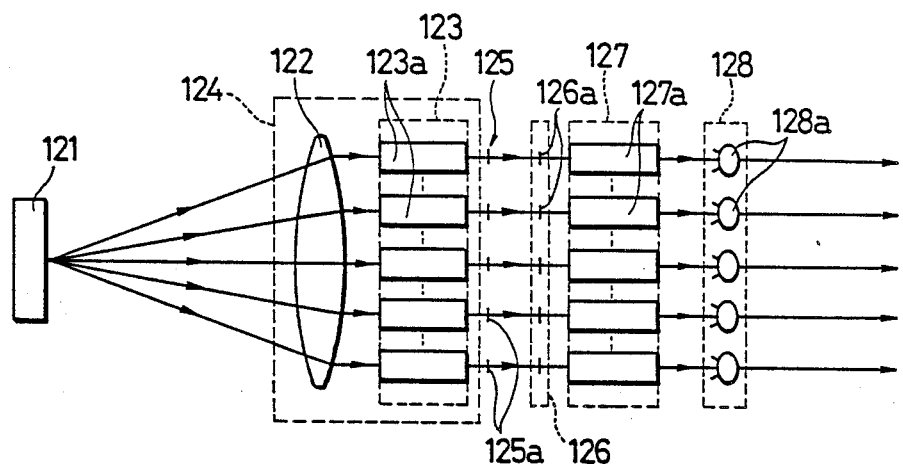
FIG. 16 is a schematic view of a second optical correlation calculation unit shown in FIG. 1D.

The second optical correlation calculation unit 27 is constituted by a plurality of small units each shown in FIG. 16. Optical correlation calculations are performed in one or some of the small units designated by the secondary recognition judgment processor 32. An input character stored in the isolated character memory 11 is displayed as an optical image on the screen of a dislay 121 of the designated small unit of the second optical correlation calculation unit 27.

A projection lens 122 is located in front of the screen of the display 121 and is spaced apart therefrom by a focal length of the lens 122. Therefore, light from the input image displayed on the screen of the display 121 is collimated by the projection lens 122. The collimated beam from the projection lens 122 is incident on a first lens array 123. The first lens array 123 comprises a large number of image formation lenses 123a (several hundreds of lenses in this case) comprising gradient index microlenses. The first lens array 123 may be a planar microlens or an SLA in the same manner as in the lens array 43, the first lens array 63 and the second lens array 66.

Figure 17:
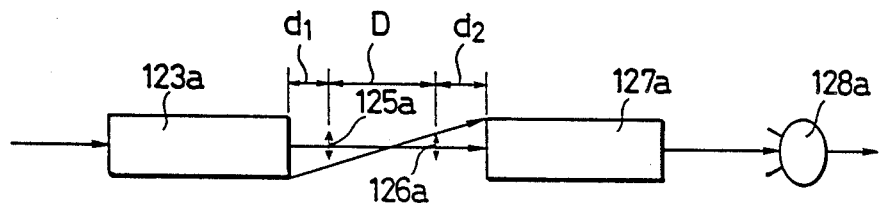
FIG. 17 is a schematic view showing a main part of the optical correlation calculation unit of FIG. 16 so as to explain optical correlation calculations.

The projection lens 122 and the lens array 123 constitute the multiplier 124 for optically multiplying the input character. The input image formed on the screen of the display 121 and guided to the first lens array 123 through the projection lens 122 is multiplied by the image formation lenses 123a of the lens array 123 at positions in the vicinities of the focuses thereof. Therefore, optical pattern images 125a shown in FIG. 18 are respectively and simultaneously formed on imaginary image formation planes 125 spaced from the end faces of the image formation lenses 123a by a distance $d_1$ (FIG. 17).

A mask array 126 is arranged in front of the image formation planes 125. The mask array 126 comprises a large number of reference masks 126a aligned substantially on a plane. The reference masks 126a are arranged on the optical axis of the image formation lenses 123a in one-to-one correspondence therewith and are spaced apart from the image formation planes 125 by a predetermined distance D (FIG. 17). Since the reference masks 126a are located at positions spaced apart from the image formation planes 125 by the predetermined distance D, the optical pattern images 125a are projected on the reference masks 126a in a diffused manner. Therefore, even if the optical pattern images 125a and the reference patterns of the reference masks 126a are not moved relative to each other, a correlation function therebetween can be calculated in a manner to be described later.

Figure 18:
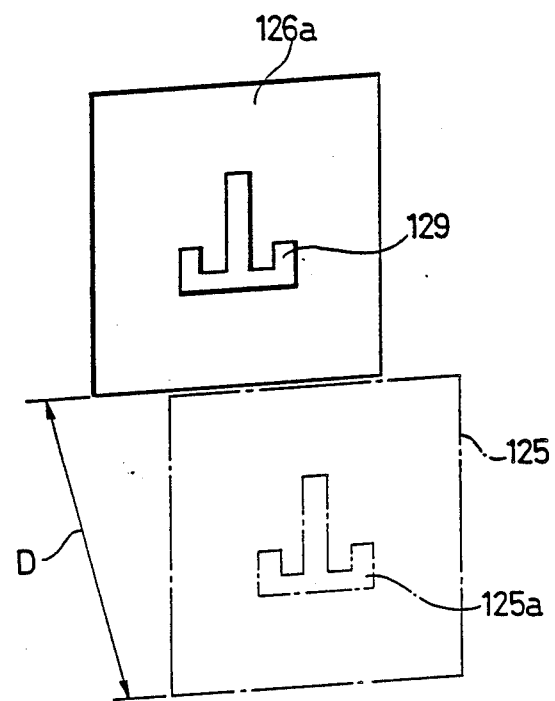
FIG. 18 is a perspective view showing the relationship between the input image and the reference mask so as to explain optical calculations of auto-correlation functions in the optical correlation calculation unit shown in FIG. 16.

Each reference mask 126a has a known reference pattern 129 having the same lightness polarity as that of the input image, as shown in FIG. 18. The reference patterns 129 are obtained by patterning reference characters stored in a look-up table (graphic/character pattern code table) 22 (to be described later). One-to-one correspondence is established between the character addresses stored in the look-up table 22 and the positions of the reference masks 126a constituting the mask array 126.

The reference masks 126a may be constituted as variable masks by spatial modulation elements using a liquid crystal as a display medium. In this case, the reference data corresponding to each reference pattern 129 is digitally stored in the data base 28 (FIG. 1D) for each reference mask 126a. The reference data is transferred for each candidate character from the data base 28 to each spatial modulation element in one or some designated small units in the optical correlation calculation unit 27, thereby forming desired reference patterns 129. For this reason, the number of small units is small, and the scale of the optical system can be reduced.

The reference mask 126a may be a fixed mask. The fixed mask has the reference pattern 129 of a predetermined shape which is not changed into any other shape. In this case, the reference character group belonging to an identical class is patterned in one small unit in the optical correlation calculation units 27 to obtain an entire reference character pattern by the plurality of small units. For this reason, the reference masks 126a serve as a mask data base.

A second lens array 127 having a large number of condenser lenses 127a respectively corresponding to the reference masks 126a is arranged in front of the mask array 126. The second lens array 127 may comprise a planar microlens or an SLA in the same manner as in the first lens array 123 and etc. Therefore, the beams passing through the reference masks 126a are condensed by the corresponding condenser lenses 127a and are guided to a photosensor array 128.

The photosensor array 128 comprises a large number of photosensors 128a arranged in the vicinities of the condensing points of the condenser lenses 127a in one-to-one correspondence therewith. The beams passing through the reference masks 126a are respectively condensed by the condenser lenses 127a, and the intensities of these beams are detected by the corresponding photosensors 128a.

In order to make easy discrimination of similarity between the input image and the reference pattern 129, outputs from the photosensors 128a are normalized for each reference mask 126a according to maximum amounts of light which can pass through the corresponding reference masks 126a. The normalized sensor outputs are supplied to the secondary recognition judgment processor 32 to be described later and the levels of the normalized sensor outputs are compared with reference to the predetermined threshold values, thereby performing ordering of recognition candidate characters. In this case, that the reference pattern of the reference mask 126a provides a sensor output closer to the normalized value means a better matching of the reference pattern with the input character and so a higher degree of similarity between the reference pattern and the input character.

The optical correlation calculations in the optical correlation calculation unit 27 of FIG. 16 will be described in detail with reference to FIGS. 17 and 18.

Referring to FIG. 17, the image formation lens 123a comprises a gradient index lens, the refractive index of which is continuously decreased from the optical axis in the radial direction. The collimated beam incident from the projection lens 122 to the image formation lens 123a propagates in the image formation lens 123a in a zigzag manner along the optical axis and is output from the end surface of the lens 123a. The optical pattern image 125a is formed at a position of the imaginary image formation plane 125 spaced apart from the end surface by the distance $d_1$.

The corresponding reference mask 126a is located at a position spaced apart from the image formation plane 125 by the predetermined distance D. For this reason, the input image is projected on the reference mask 126a in a diffused state. The predetermined distance D is illustrated to be relatively long in FIGS. 16 to 18. However, the predetermined distance D is short in practice. The corresponding condenser lens 127a is located at a position spaced apart from the reference mask 126a by a distance $d_2$.

Since the predetermined distance D is assured, beams from all points of the optical pattern image 125a are incident on all points of the reference mask 126a. For this reason, correlation calculations can be instantaneously performed on the reference mask 126a in the same manner as in the case wherein the input image is continuously shifted with respect to the reference pattern 129 by a predetermined shift amount. Therefore, a cross-correlation function can be obtained between the input image and the reference mask 126a different therefrom, and an auto-correlation function can be obtained between the input image and the reference mask 126a substantially identical therewith.

The predetermined distance D must be determined so as to allow instantaneous derivation of the auto-correlation or cross-correlation function. In order to satisfy the above requirement, the predetermined distance D is preferably a value of D or near this value at the time when the beams from all points of the optical pattern image 125a are initially incident on all points of the reference mask 126a as the value of D is gradually increased from zero. If the size (e.g., a height of the mask 126a) of the reference mask 126a, the focal length of the condenser lens 127a, and the height of the image of the reference mask 126a formed on the photosensor 128a are defined as Ym, $f_1$, and Ym', respectively, the following equation is approximated:

$$Ym/D = Ym'/f_1$$

If the heights Ym and Ym' and the focal length $f_1$ are given to be about 500 μm, about 500 μm or less, and several millimeters, respectively, the predetermined distance D can be set to be several millimeters.

FIG. 18 shows a state wherein an auto-correlation function is obtained when the input image is Chinese character "山". In this case, the optical pattern image 125a of Chinese character "山" is formed on the imaginary image formation plane 125. The reference mask 126a having the reference pattern 129 of Chinese character "山" is located at a position spaced apart from the optical pattern image 125a by the predetermined distance D.

In the state of FIG. 18, even if the shape of the reference pattern 129 completely coincides with that of the optical pattern image 125a, the optical pattern image 125a is projected in a diffused manner, i.e., out of focus, on the reference pattern 129 due to the presence of the predetermined distance D. In this case, if the predetermined distance D is excessively short, the effect is not much different from that obtained when the optical pattern 125a is formed on the reference mask 126a. However, if the predetermined distance D is excessively long, the input image is excessively out of focus and cannot be used for pattern matching. Therefore, the predetermined distance D is preferably set to be a proper distance enough to instantaneously calculate correlation functions between the input image and the reference patterns 129.

In the second optical correlation calculation unit 27 having the arrangement described above, after the input character is displayed on the display 121, multiplication of the input character, optical pattern matching between the multiple optical pattern images and the reference patterns 129 of the plurality of reference masks 126a, and condensing of the light passing through the reference masks 126a by the condenser lenses 127a can be serially and parallelly in time at the light propagation speed. In addition, the condensed lights can be simultaneously detected by the plurality of photosensors 128 in a short response time.

The first optical correlation calculation unit 13 is, as described above, substantially the same as the second optical correlation calculation unit 27 except that the shapes of the reference patterns formed on the reference masks 126a are different from those in the second optical correlation calculation unit 27. More specifically, the reference patterns in the second optical correlation calculation unit 27 are reference character patterns. However, the reference patterns in the first optical correlation calculation unit 13 are primitive patterns (in other words, local features common to the plurality of reference characters) included in the plurality of reference characters.

Figure 19:
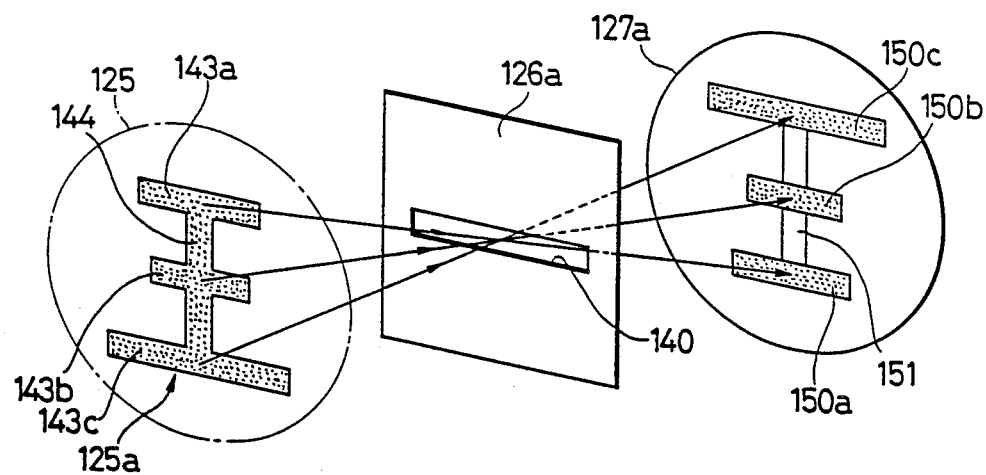
FIG. 19 is a schematic perspective view showing the relationship between the input image, a reference mask having a horizontal line slit, and a condenser lens in the first optical correlation calculation unit shown in FIG. 1A.
Figure 20:
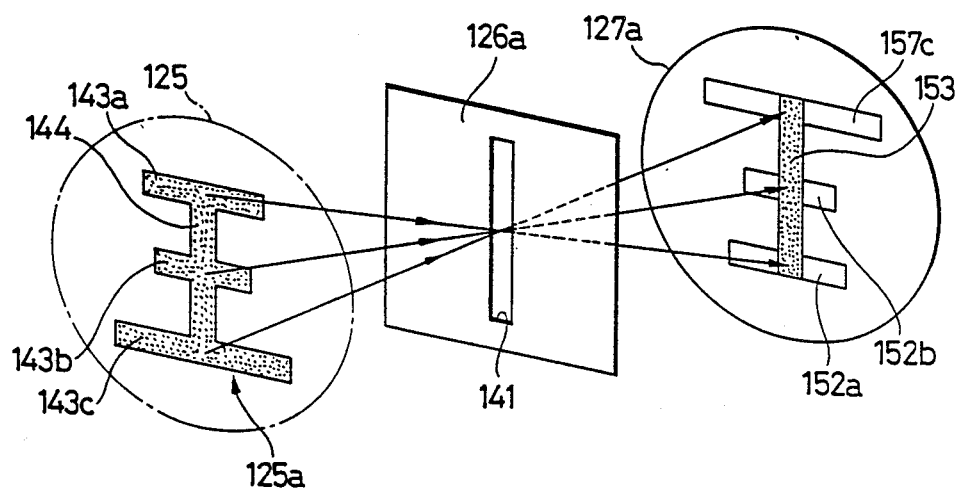
FIG. 20 is a schematic perspective view showing the relationship between the input image, a reference mask having a vertical line slit, and the condenser lens in the first optical correlation calculation unit shown in FIG. 1A.
Figure 21:
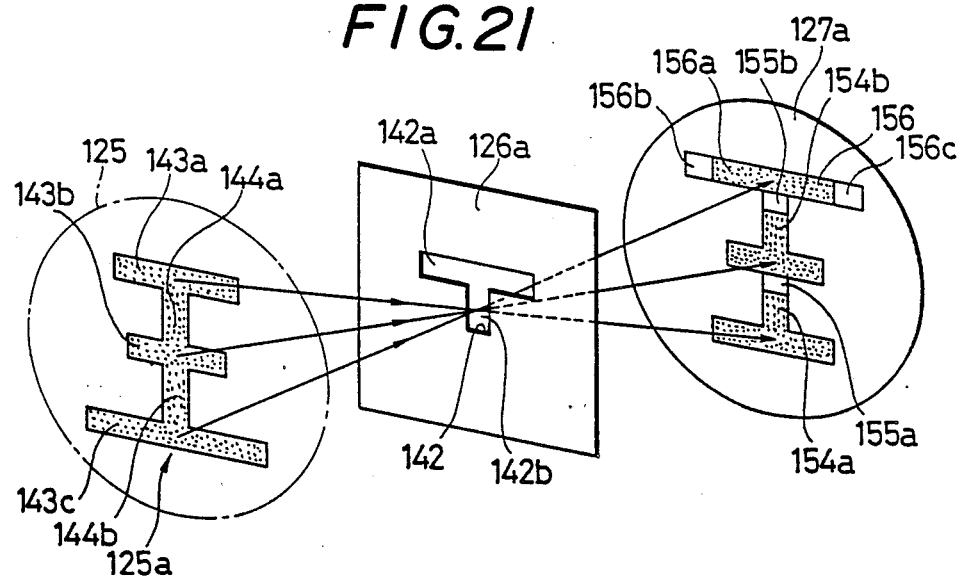
FIG. 21 is a schematic perspective view showing the relationship between the input image, a reference mask having a T-shaped slit, and the condenser lens in the first optical correlation calculation unit shown in FIG. 1A.

The primitive patterns as the reference pattern are given as follows. For example, a primitive pattern in FIG. 19 is a horizontal component "-" pattern formed by a horizontal line slit 140. A primitive pattern in FIG. 20 is a vertical component "|" pattern formed by a vertical line slit 141. A primitive pattern in FIG. 21 is a T-shaped component "T" pattern formed by a T-shaped slit 142. Other various primitive patterns may be proposed. The first optical correlation calculation unit 13 is constituted by using a plurality of reference masks having various primitive patterns, as the reference masks 126a in FIGS. 16 and 17.

FIGS. 19 to 21 show cases wherein an input character representing Chinese character '王' is displayed on the display 121 and primitive patterns (the horizontal component "-", the vertical component "|", and the T-shaped component "T", all of which are local features included in the input character) of the input character are extracted from the optical pattern images 125a through reference masks 126a.

In the case of FIG. 19, beams from three horizontal parallel line segments 143a, 143b, and 143c of the optical pattern image 125a pass without any change through a horizontal slit 140. The passed beams are projected as an inverted image on the condenser lens 127a. Therefore, three strongly bright parts 150a, 150b and 150c are formed on the light-receiving surface of the lens 127a. A beam from one vertical line segment 144 of the optical pattern image 125a is substantially perpendicular to the horizontal slit 140. For the reason, one weakly bright part 151 is formed on the light-receiving surface of the condenser lens 127a. Therefore, an output from the corresponding photosensor 128a allows recognition that the input Chinese character "王" has three horizontal line segments 143a, 143b and 143c, or equivalent horizontal line segments.

In the case of FIG. 20, unlike in the case of FIG. 19, three weakly bright parts 152a, 152b and 152c and one strongly bright part 153 are formed on the light-receiving surface of the condenser lens 127a. An output from the corresponding photosensor 128a allows recognition that the input Chinese character " " has one vertical line segment 144 or equivalent vertical line segments.

In the case of FIG. 21, a horizontal slit portion 142a and a vertical slit portion 142b of a T-shaped slit 142 are respectively shorter than the horizontal and vertical slits 140 and 141 shown in FIGS. 19 and 20. In the case of FIG. 21, the T-shaped component of the optical pattern image 125a is primarily extracted through the T-shaped slit 142. In this case, the T-shaped component of the optical pattern image 125a is a combination of a horizontal line segment 143a and an upper vertical line segment 144a, and a combination of a horizontal line segment 143b and a lower vertical line segment 144b. T-shaped strongly-bright parts 154a and 154b corresponding to the T-shaped component is formed as an inverted image of the T-shaped component.

The horizontal slit portion 142a and the vertical slit portion 142b of the T-shaped slit 142 are relatively short, as described above. The two vertical line segments 144a and 144b of the optical pattern image 125a allow formation of weakly bright parts 155a and 155b on the light-receiving surface of the condenser lens 127a. Since the remaining horizontal line segment 143c is extracted through the T-shaped slit 142, a central strongly-bright part 156a and end weakly-bright parts 156b and 156c are formed on the light-receiving surface of the condenser lens 127a. An output from the corresponding photosensor 128a allows recognition that the input character "王" has two or three T-shaped components (or horizontal and/or vertical line segments equivalent thereto).

The number of times of occurrence of the primitive patterns such as horizontal, vertical and T-shaped components constituting input characters can be detected as intensity of sensor outputs in units of input characters.

The sensor outputs are preferably normalized. In the reference pattern shown in FIG. 19, the sensor outputs are normalized with reference to the output from the photosensor 128a in the case that the horizontal line segment is formed at the center of the image formation plane 125.

A correspondence between vector component numbers and the reference patterns as the primitive patterns (local features) is established. The normalized sensor outputs of the extracted primitive patterns represent the magnitudes of the vector components. For example, when three reference masks 126a shown in FIGS. 19 to 21 are used, a 3-dimensional vector can be obtained. Therefore, the plurality of reference masks 126a having a plurality of primitive patterns as the reference patterns are arranged, and the photosensors 128a are arranged in one-to-one correspondence therewith. And the detection data from the photosensors 128a are processed in the manner as described above to obtain a multi-dimensional vector.

V: Primary Image Recognizing Means (FIGS. 1, 1A to 1C, 4 to 17, and 19 to 21)

The primary image recognizing means constituted by the primary recognized data output unit 16 and the primary recognition judgment processor 19 for judging reliability of the primary recognition result of the data output unit 16 will be described below.

In response to a command from the main processor 10, the input character stored in the isolated character memory 11 is read out as a digital image value to the projection calculation unit 12 and the optical correlation calculation unit 13. The digital signals of the input character are displayed as optical images on the display 41 in the projection calculation unit 12 and the display 121 in the optical correlation calculation unit 13.

A set of projection data (of each axis) output from each projection photosensor 45a in the projection calculation unit 12 and a set of local feature data by optical correlation calculations from the photosensor 128 for extracting primitive patterns as the local features of the input character in the first optical correlation calculation unit 13 are displayed as image patterns corresponding to the vector components on the vector display 61 in the vector discrimination unit 14. A set of projection data and a set of local feature data correspond to vector components whose magnitudes respectively correspond to levels of these data. These data are displayed as bright line patterns at positions corresponding to the magnitides of the vector components in areas obtained by assigning the screen of the vector display 61. Actually, the bright line pattern group as a set of bright line patterns corresponds to the features extracted from the input character.

Figure 1C:
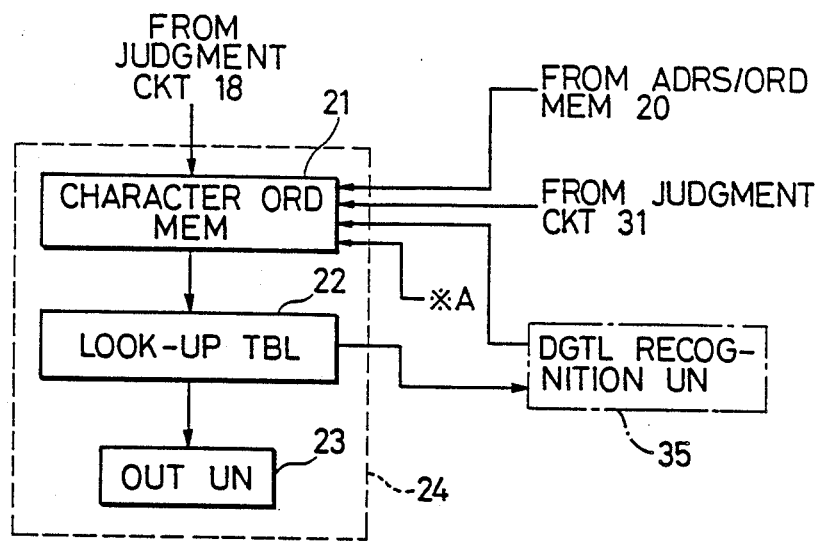
FIG. 1C is a block diagram of a means for outputting a recognized character shown in FIG. 1.
Figure 1D:
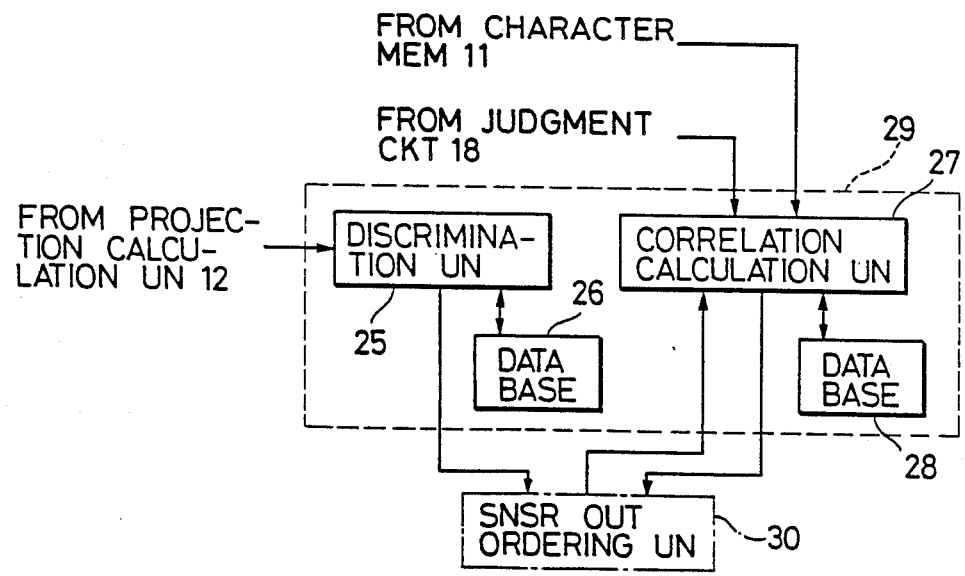
FIG. 1D is a block diagram of a secondary recognized data output unit shown in FIG. 1.

The primary recognition judgment processor 19 comprises a normalized sensor output ordering unit 17 and an output value judgment circuit 18, as shown in FIG. 1B. Normalized sensor outputs v from the plurality of photosensors 67a according to optical pattern matching in the vector discrimination unit 14 are ordered depending on positions (addresses) of the look-up table (graphic/character pattern code table) 22 (FIG. 1C). The ordered normalized sensor outputs v are simultaneously addressed.

Ordering with addressing can be performed in the following manner. The normalized sensor outputs v from the photosensors 67a are stored together with the address data in an internal memory in the normalized sensor output ordering unit 17. The internal memory addresses are defined in one-to-one correspondence with the addresses of the look-up table 22. For this reason, the reference characters stored as digital values at the corresponding addresses of the look-up table 22 can be accessed by the addresses of the internal memory. The addressed normalized sensor outputs v are compared with each other in the ordering unit 17, and the address data from the larger data to the smaller data are stored in the recognized character address/order memory 20.

Ordering of the address data actually corresponds to ordering of the reference character data stored at the corresponding addresses of the look-up table 22. Therefore, in this condition, the order of primary recognition candidate characters for the input character is determined.

A recognition judgment threshold value $v_{th1}$ is set in an output value judgment circuit 18 in the primary recognition judgment processor 19. The threshold value $v_{th1}$ can be set using, e.g., a peak detector. The degree of recognition accuracy (reliability of the recognition result) of the ordered primary recognition candidate characters is determined with reference to the value $v_{th1}$. More specifically, if at least high-rank normalized sensor outputs corresponding to the primary recognition candidate characters satisfy $v \geq v_{th1}$, in order to output the high-rank candidate characters as the recognized characters, address data corresponding to the high-rank candidate characters is sent to the recognition candidate character order memory 21 as character information data. If $v < v_{th1}$ is established, recognition accuracy is insufficient although the character may be deciphered. In this case, secondary image recognition is performed by the secondary image recognizing means.

VI: Recognized Character Output Means (FIGS. 1, 1C and 22)

The look-up table 22 serves as a graphic/character pattern code table for storing digital character data in a matrix form. The digital character data represent level 1 and 2 Chinese characters defined in JIS C6226 (Code of the Japanese Graphic Character Set for Information Interchange). The recognition candidate character order memory 21, the look-up table 22, and an output unit 23 (to be described later) constitute the recognized character output means 24.

FIG. 22 shows part of the look-up table 22 typically. For example, character data of Chinese character "机" is stored at address (16,21). The addresses of the look-up table 22 are defined in one-to-one correspondence with the positions of the photosensors 67a and 128a of the sensor arrays 67 and 128 in the vector discrimination units 14 and 25 and the first and second optical correlation calculation units 13 and 27.

The characters stored at the addresses of the look-up table 22 can be detected according to the corresponding peculiar positions of the photosensors 67a and 128a. In practice, the look-up table 22 is addressed by row and column address data (each consisting of 8 bits). The character is extracted from the data area accessed by the designated address data. Therefore, the recognition candidate character address data stored as the character information data in the recognition candidate character order memory 21 is supplied to address the look-up table 22, and the character at the designated address is output from the output unit 23. For example, if the candidate character address data of the first rank stored in the recognition candidate character order memory 21 is output to address the look-up table 22, the candidate character of the first rank is output as the recognized character from the output unit 23.

VII: Secondary Image Recognizing Means (FIGS. 1, 1D, 1E, 10 and 12 to 18)

Even if the high-rank normalized sensor outputs v generated by the vector discrimination unit 14 and ordered by the normalized sensor output ordering unit 17 are lower than the recognization threshold value $v_{th1}$ to fail to obtain satisfactory recognition accuracy (i.e., $v < v_{th1}$), as described above, secondary image recognition processing is performed by the secondary image recognizing means. The secondary image recognizing means constituted by the secondary recognized data output unit 29 and the secondary recognition judgment processor 32 for judging reliability of the secondary recognition result of the data output unit 29, as shown in FIG. 1, will be described below.

Figure 1E:
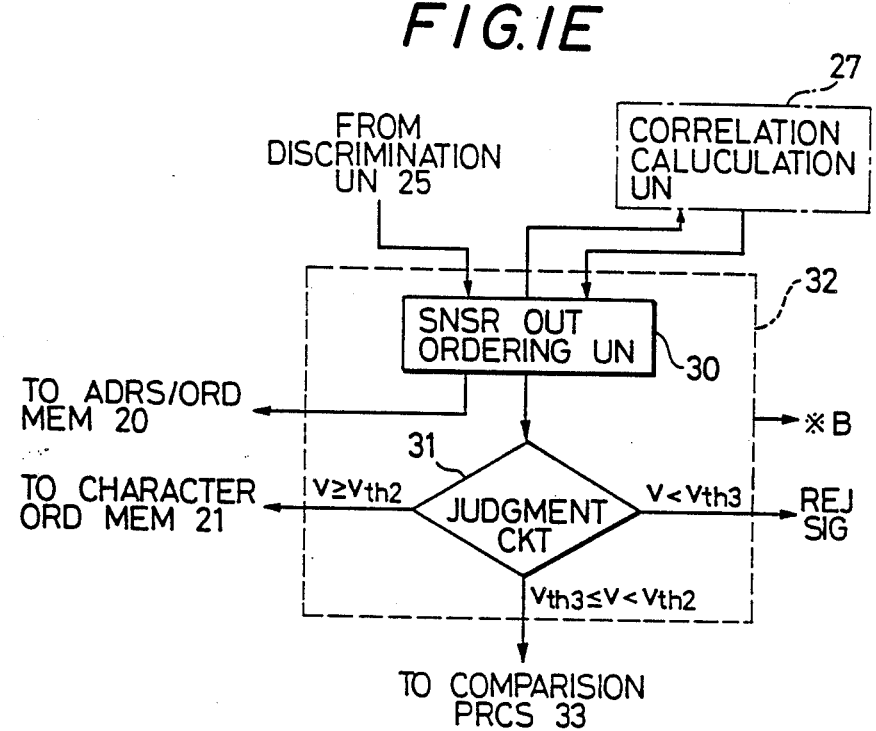
FIG. 1E is a block diagram of a secondary recognition judgment processor.

The features for rough classification, e.g., features shown in FIG. 12 and extracted by the projection calculation unit 12 have already transferred to the vector discrimination unit 25 (FIG. 1D) in the secondary recognition data output unit 29. The input features are displayed on the vector display 61. Referring to FIG. 10, the mask array 65 comprises a plurality of reference masks 65a respectively having a plurality of reference patterns corresponding to the features. The input character features displayed on the vector display 61 are matched with the reference masks 65a. The degree of pattern matching is detected as outputs from the photosensors 67a. These sensor outputs are transferred to the secondary recognition judgment processor comprising the normalized sensor output ordering unit 30 and the output value judgement circuit 31, as shown in FIG. 1E. Ordering of recognition candidate characters for rough classification is performed by the ordering unit 30 according to the magnitudes of the sensor outputs.

A large number of high-rank candidate characters obtained as a result of primary image recognition processing in the primary image recognizing means can be used as recognition candidate characters for rough classification. In this case, the vector discrimination unit 25 can be omitted. The character group (rough classification recognition candidate characters) recognized by rough classification are transferred as drive control signals from the ordering unit 30 (FIG. 1E) to the sensor array 128 in the optical correlation calculation unit 27 (FIG. 1D). Since one-to-one correspondence between the character addresses in the ordering unit 30 and the character addresses of the sensor array 128 is established, only the sensor outputs corresponding to the characters recognized by rough classification can be extracted from the second optical correlation calculation unit 27 in response to the drive control signals. The above operation can be simultaneously performed with the primary image recognition. Therefore, if the degree of recognition accuracy in primary image recognition processing is judged to be unsatisfactory (i.e., $v<v_{th1}$), character information data is immediately transferred from the isolated character memory 11 to the display 121 in the optical correlation calculation unit 27. Only the sensor outputs corresponding to the recognition candidate characters by rough classification data can be extracted from the second optical correlation calculation unit 27.

If the reference mask 126a in the optical correlation calculation unit 27 is a variable mask, as previously mentioned, only reference data associated with the high-rank candidate characters (100 characters) of the recognized character group by rough classification are transferred from the data base 28 to the variable mask, so that the desired character reference patterns for optical correlation calculations are respectively formed on the reference masks 126a.

The optical correlation calculation unit 27, as described above, performs optical correlation calculations between the character patterns of the input character and the reference patterns 129 of the plurality of reference masks 126a. Lights as the optical correlation calculation results passing through the reference masks 126a are respectively incident on the photosensors 128a in one-to-one correspondence. The outputs from the photosensors 128a are normalized with reference to the maximum amounts of light passing through the corresponding reference masks 126a for each reference mask 126a.

The secondary recognition judgment processor 32 orders the normalized sensor outputs v which are output from a small number of photosensors 128a selected according to rough classification data and which are obtained by optical correlation calculations in the optical correlation calculation unit 27 in the same manner as in the primary recognition judgment processor 19, as previously mentioned. Since ordering is performed by addressing of the look-up table 22 whose addresses are defined in one-to-one correspondence with the positions of the reference masks 126a, the ordered normalized sensor outputs v are addressed in this manner.

Accordingly, the order of the secondary recognition candidate characters for the input character is set, and the recognized character order and its address are stored in the memory 20.

Recognition judgment threshold values $v_{th2}$ and $v_{th3}$ are set in the output value judgement circuit 31 in the secondary recognition judgment processor 32. These threshold values can be set using, e.g., a peak detector. The degree of recognition accuracy of the secondary recognition candidate characters is determined with reference to the recognition judgment threshold values $v_{th2}$ and $v_{th3}$. More specifically, if condition $v \geq v_{th2}$ is established for at least high-rank normalized sensor outputs v corresponding to the secondary recognition candidate characters, the address data corresponding to the high-rank candidate characters is sent as character information data to the recognization candidate character order memory 21 in order to output these high-rank candidate characters as the recognized characters. If the normalized sensor output v is lower than the threshold value $v_{th2}$ but close thereto, more specifically if $v_{th3} \leq v < v_{th2}$ is established, character may be deciphered. However, under this condition, the final judgment for recognition is not made.

When optical correlation calculations for the roughly classified high-rank recognition candidate characters are to be performed, as described above, the address data of the primary recognition candidate characters are prestored in the recognized character address/order memory 20. Therefore, in the above case, the address data of the secondary recognition candidate characters up to 100th rank are transferred to the character order comparison processor 33 so as to be compared with the primary recognition candidate characters. If the normalized sensor output v is lower than $v_{th3}$, i.e., $v<v_{th3}$, input character decipherment is judged to be impossible. A reject signal is supplied from the output judgment circuit 31 to the output unit 23.

VIII: Supplementary Image Recognizing Means (FIG. 1)

The character order comparison processor 33 (FIG. 1) constituting the supplementary image recognizing means will be described below. The processor 33 reinforces primary character recognition processing and secondary character recognition processing, when the ordered normalized sensor output v is lower than the recognition judgment threshold value $v_{th1}$ in the primary recognition judgement processor 19 and the ordered normalized sensor output satisfies $v_{th3} \leq v < v_{th2}$ in the secondary recognition judgment processor 32.

In this case, the address data corresponding to the primary and secondary recognition candidate characters up to, e.g., the 100th rank are stored in the recognized character address/order memory 20. The address data corresponding to the primary and secondary recognition candidate characters are supplied from the first rank from the recognized character address/order memory 20, the character order comparison processor 33 sequentially compares the address data for the primary and secondary recognition candidate characters from the first rank to the 100th rank. If the upper address data coincide with each other or at least the address data of the first rank coincide in the sequential comparison from the first rank to the 100th place, the address data of the first rank is sent to the recognition candidate character order memory 21. Therefore, when the look-up table 22 receives the address data of the first rank, the character data stored at the corresponding address is read out. The readout data is output as the recognized character from the output unit 23.

If the character order comparison processor 33 judges a noncoincidence of orders of the primary and secondary candidate characters including the address data of the first rank, character data corresponding to at least the address data of the high-rank group which includes the address data of the first rank is sent from the look-up table 22 to the auxiliary digital recognition unit 35 according to the memory contents of the recognized character address/order memory 20 so as to perform character recognition processing by electronic digital correlation calculations in the auxiliary digital recognition unit 35. In this case, the input character data stored in the isolated character memory 11 is also sent to the auxiliary digital recognition unit 35. Digital correlation calculations are performed between the digital pattern data of the input character and the digital pattern data of the recognition candidate characters sent from the look-up table 22.

If a plurality of similar characters are present in the candidate characters as the result of order comparison between the primary and secondary recognition candidate characters by the character order comparison processor 33 (in particular, the sensor output values of the plurality of similar characters are the same), it is difficult to recognize the order of similar characters. The address data corresponding to the similar characters are sent to the look-up table 34 for similar characters.

The character data to be extracted by the look-up table 34 for similar characters is sent to the auxiliary digital recognition unit 35. For the sake of correlation calculations, a command for transferring the input character data to the auxiliary digital recognition unit 35 is supplied to the isolated character memory 11 while the address data is being sent to the look-up table 34 for similar characters.

IX: Electronic Image Recognizing Means (FIGS. 1 and 23)

The electronic image recognizing means constituted by the look-up table 34 for similar characters and the auxiliary digital recognition unit 35 will be described below.

At first, the look-up table 34 for similar characters will be described below. The look-up table 34 for similar characters has addresses in a matrix form. As is apparent from FIG. 23, data representing similar characters are stored at, e.g., identical column addresses.

Referring to FIG. 23, for example, character data representing a plurality of similar Chinese characters "太", "大", "犬", . . . are respectively stored at the 11th column addresses (11,1), (11,2), (11,3), . . . Similarly, character data representing a plurality of similar Chinese characters "王", "玉", "主", . . . are respectively stored at the 12th column addresses (12,1), (12,2), (12,3), . . . These character data are stored with data representing the corresponding addresses of the look-up table 22.

If the primary candidate characters include similar characters "王", "玉", and "主" as a result of comparison of the primary and secondary recognition candidate characters in the character order comparison processor 33, the address data corresponding to the similar characters are sent to the look-up table 34 for similar characters and addresses (12,1), (12,2), and (12,3) are designated. In this case, all 12th column addresses may be designated as needed.

When the addresses at which the similar characters are stored are designated, character data together with the address data is supplied to the auxiliary digital recognition unit 35 in order to recognize the character by digital correlation calculations.

Since the look-up table 34 for similar characters is arranged as described above, the similar characters can be easily extracted within a short access time.

Next, the auxiliary digital recognition unit 35 will be described below.

As previously mentioned, if noncoincidences between the orders of the primary recognition candidate characters and the orders of the secondary recognition candidate characters are judged by the character order comparison processor 33, or if the character data of the similar characters from the look-up table 34 for similar characters is transferred, the auxiliary digital recognition unit 35 performs digital correlation calculations. Therefore, the auxiliary digital recognition unit 35 has a function for reinforcing character recognition processing by the optical image recognizing means.

In the auxiliary digital recognition unit 35, the data (binary digital pattern data) of the input character which is sent from the isolated character memory 11 is stored as a digital pattern in an $M \times N$ matrix memory corresponding to the orthogonal coordinate system. The recognition candidate character data sent from the character order comparison processor 33 and the look-up table 34 for similar characters are also stored as digital patterns in the memory.

The degree of correlation between the input character and the recognition candidate characters is determined by a correlation function between the input character and the recognition candidate character. The digital correlation function is obtained in consideration of a positional error of the input character and a variety of formats (a handwritten or printed character, kinds of printing styles of penmanship, etc.) of the input characters. The correlation function is derived by relatively shifting the origin of the digital pattern of the input character to the origin of the digital pattern of the recognition candidate character in such a manner that shifts of these origins are sequentially changed relative to each other, and by calculating the sum of the products of the corresponding image values of the input character and the recognition candidate character for every shift.

In the x-y coordinate system, when the functions of the digital patterns of the input character and the recognition candidate character are defined as $f(x,y)$ and $g(x,y)$, respectively, and a relative shift of the input character and the recognition candidate character is defined as $(x_k, y_l)$, a correlation value between the input character and the recognition candidate character is calculated as follows:

$$F(x_k, y_l) = \sum_{i,j}^{M,N} f(x_i + x_k, y_j + y_l) g(x_i, y_j) \tag{1}$$

If $k=1$ to M and $l=1$ to N, then the correlation function can be obtained.

In such correlation calculations, if the input character $f(x,y)$ resembles the recognition candidate character $g(x,y)$, the resultant correlation value is large. If the recognition candidate character $g(x,y)$ coincides with the input character $f(x,y)$, an auto-correlation function is derived. Otherwise, if they noncoincide with each other, a cross-correlation function is derived. Similar correlation calculations are performed for a large number of recognition candidate characters whose data are sent. The correlation functions of the respective recognition candidate characters are compared with each other or with a reference value, thereby judging the degree of similarity between the input character and the recognition candidate characters.

The above digital correlation calculations can be performed by the auxiliary digital recognition unit 35 arranged as a special-purpose image recognition unit.

In the above digital correlation calculations, as described above, a larger number of calculations are generally required. However, in the image recognition apparatus shown in FIG. 1, the recognition candidate characters subjected to calculations are limited to the judgment results of the primary recognition judgment processor 19, the second recognition judgment processor 32 and the character order comparison processor 33. For this reason, the long processing time required in the conventional apparatus can be shortened. In this case, recognition accuracy in character recognition on the basis of the digital correlation calculations is very high as a matter of course.

The address data of the recognition candidate characters judged to have the highest degree of similarity to the input character in the auxiliary digital recognition unit 35 are sent to the recognition candidate character order memory 21. The character data, whose address is designated through the look-up table 22, is output as the recognized character from the output unit 23.

X: Primary Image Recognition Processing (FIGS. 1, 2A, and 2B)

Primary image recognition processing by the primary image recognition processing means will be described with reference to flow charts in FIGS. 2A and 2B. Reference symbols $P_1$ to $P_{13}$ and $P_1'$ to $P_4'$ denote steps in the flow charts.

Figure 2A:
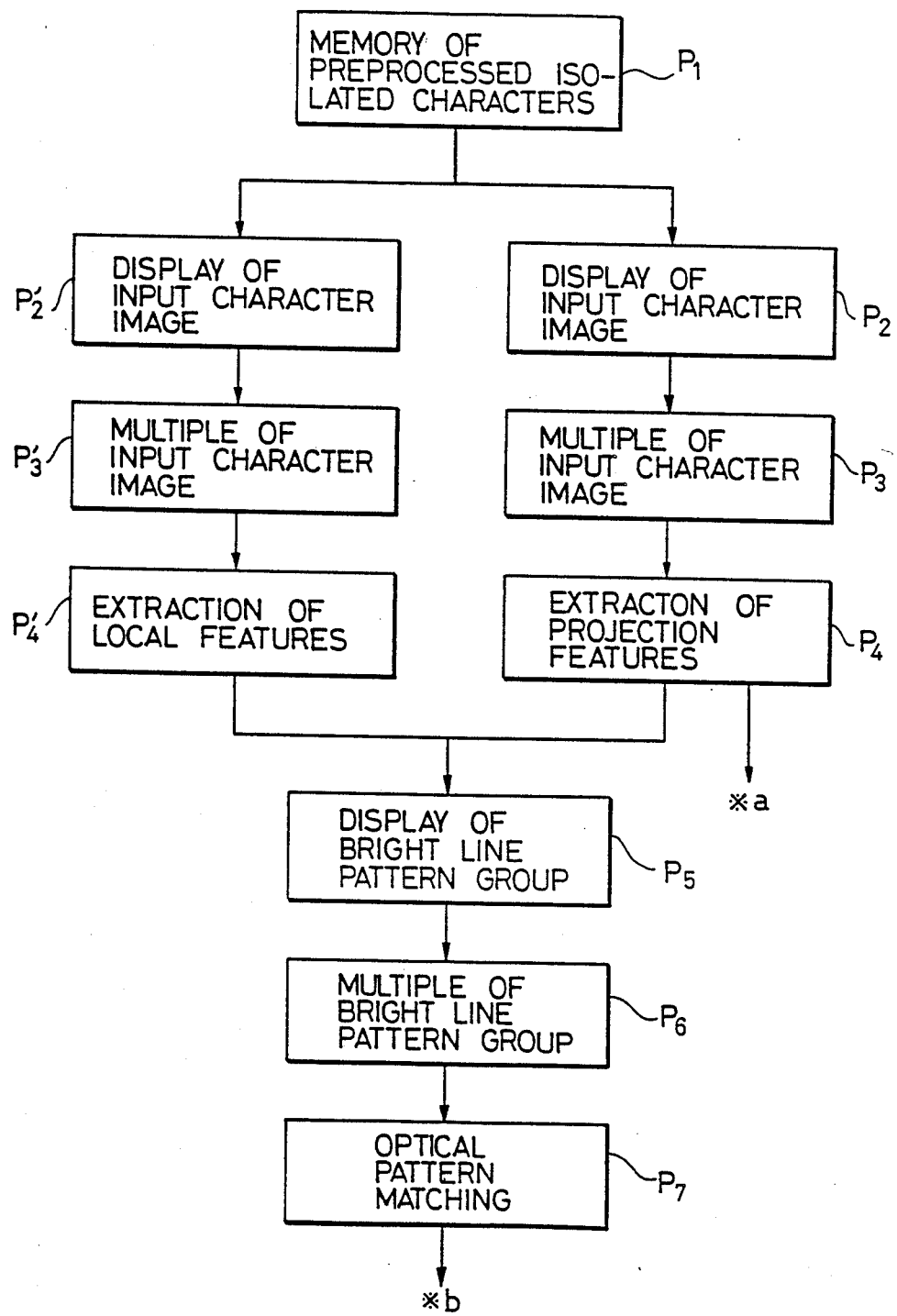
FIG. 2A is a flow chart showing the first half of primary image recognition processing by an optical image recognizing means in image recognition processing performed by the image recognition apparatus shown in FIG. 1.
Figure 2B:
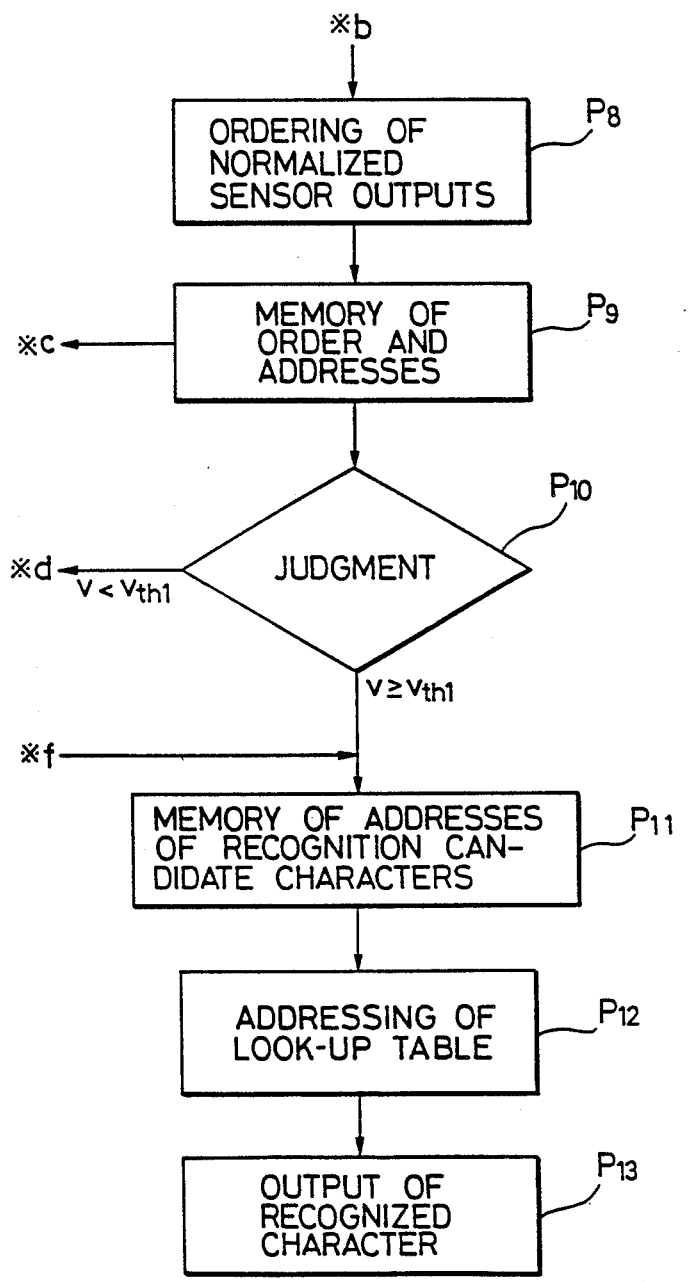
FIG. 2B is a flow chart showing the second half of primary image recognition processing by the optical image recognizing means.

Preprocessed isolated character data is stored in the isolated character memory 11, as shown in FIG. 2A ($P_1$). The isolated character data is transferred to the projection calculation unit 12 shown in FIG. 4 and an optical image of the input character is displayed on the screen of the display 41 in the projection calculation unit 12 ($P_2$).

When the input character is displayed on the display 41 in the projection calculation unit 12 shown in FIG. 4 the image of the input character is multiplied by the multiplier 44 consisting of the projection lens 42 and the lens array 43 ($P_3$). Therefore, optical pattern images of substantially an identical shape are respectively formed on the light-receiving surfaces of the plurality of the projection photosensors 45a arranged in front of the lens array 43.

Optical projection processing is performed by the projection photosensors 45a, and the various types of projection features (intensity distributions) inherent to the input character are simultaneously extracted ($P_4$). These projection features include the intensity distribution by matrix projection shown in FIG. 12. The feature data is transferred to the second vector discrimination unit 25 as the rough classifying means (see marks ✳a in FIGS. 2A and 3A). Thereafter, the electrical signals corresponding to the plurality of projection data constituting the projection features are extracted from the projection photosensors 45a, respectively.

Extraction processing of local features of the input character is performed by the first optical correlation calculation unit 13 according to optical correlation calculations simultaneously performed with projection feature extraction processing. More specifically, the isolated character data is transferred from the isolated character memory 11 to the projection calculation unit 12, as described above. At the same time, the isolated character data is also supplied to the first optical correlation calculation unit 13, so that the input character is displayed on the display 121 ($P_2'$). In the same operation as in step $P_3$, a plurality of optical pattern images of substantially an identical shape are formed ($P_3'$). The reference masks 126a (FIGS. 19 to 21) having the reference patterns 140, 141 and 142 for extracting the local features of the character allow simultaneous optical correlation calculations between the input character and the plurality of reference patterns. The cross-correlation values as the result of optical correlation calculations are detected as optical intensities by the photosensors 128a. Therefore, the plurality of primitive patterns as the local features can be extracted from the input character ($P_4'$).

The outputs (local feature data) from the photosensors 128a are output together with outputs (projection data) from the projection photosensors 45a to the first vector discrimination unit 14. Each of the set of extracted projection features and the set of extracted local features constitutes one multi-dimensional vector. In the case, a plurality of the projection data and a plurality of the local feature data constitute vector components of the multi-dimensional vector. And the size of each vector component, as previously mentioned, corresponds to the value of each projection data or each local feature data.

The plurality of projection features and the plurality of local features are displayed as bright line pattern group corresponding to the multi-dimensional vector on the screen of the vector display 61 in the vector discrimination unit 14 in FIG. 10 ($P_5$).

When the bright line pattern group is displayed on the vector display 61, the optical image of the bright line pattern group is multiplied by the multiplier 64 consisting of the projection lens 62 and the first lens array 63. The plurality of optical pattern images of substantially an identical shape are simultaneously formed on the plurality of reference masks 65a arranged in front of the first lens array 63 ($P_6$).

Simultaneous optical pattern matching between the multiplied bright line pattern groups and the reference pattern groups of the reference masks 65a is performed ($P_7$). As a result, lights corresponding to the degree of pattern matching are focused through the second lens array 66 and are simultaneously detected by the corresponding photosensors 67a.

The normalized sensor outputs v from the photosensors 67a are output to the primary recognition judgment processor 19 (see marks ✳b in FIGS. 2A and 2B).

Thereafter, as shown in FIG. 2B, the primary recognition judgment processor 19 orders the normalized sensor outputs v. Ordering with addresses of the look-up table 22 is performed, and thus ordering and addressing of the normalized sensor outputs can be simultaneously performed ($P_8$). The primary image recognition results are temporarily stored in the recognized character address/order memory 20 in a predetermined order (e.g., up to the 100th rank) so as to compare the storage contents with secondary image recognition results as described later (see marks ✳c in FIGS. 2B and 3B) ($P_9$).

The recognition judgment threshold value $v_{th1}$ is set in the primary recognition judgment processor 19. Whether there are the ordered normalized sensor outputs v which have high recognition accuracy is determined. In other words, whether condition $v \leq v_{th1}$ is established is determined ($P_{10}$). If there are ordered normalized sensor outputs v which satisfy condition $v > v_{th1}$, the address data of the high-rank normalized sensor outputs are stored in the recognition candidate character order memory 21 ($P_{11}$). The stored address data is supplied to the look-up table 22 ($P_{12}$), and the character data stored at the designated address is output as the recognized character to the output unit 23 ($P_{13}$).

Judgment for condition $v > v_{th1}$ in step $P_{10}$ indicates actually that primary recognition processing of the input character has been completed. For this reason, the primary recognition judgment processor 19 sends the address data of the normalized sensor outputs which satisfy condition $v > v_{th1}$ to the recognition candidate character order memory 21. In order to perform recognition processing of the next input character, a control signal representing the end of primary image recognition processing is supplied to the isolated character memory 11 (see mark ✻B in FIG. 1).

The isolated character memory 11 sequentially stores preprocessed isolated characters. Upon reception of the control signal, the memory 11 is accessed to transfer the data of the next isolated character (input character) to the projection calculation unit 12 and the first optical correlation calculation unit 13.

If $v < v_{th1}$ is established in step $P_{10}$, secondary image recognition processing is performed as described later (see marks ✻d in FIGS. 2B and 3A). In this case, the primary recognition judgment processor 19 sends another control signal representing the end of primary image recognition processing to the isolated character memory 11. In response to this control signal, the data of the input character to be recognized is transferred from the memory 11 to the second optical correlation calculation unit 27.

XI: Secondary Image Recognition Processing, Supplementary Image Recognition Processing, and Electronic Image Recognition Processing (FIGS. 1, 3A and 3B)

When final image recognition cannot be satisfactorily performed by primary image recognition processing, i.e., when the input character cannot be satisfactorily identified with any of the plurality of reference characters, secondary image recognition processing by the secondary image recognizing means is performed. If final image recognition cannot be satisfactorily performed by secondary image recognition processing, supplementary image recognition processing is further performed. If final image recognition is not yet satisfactorily performed by supplementary image recognition processing, electronic image recognition processing by digital correlation calculations is performed.

Therefore, these image recognition operations will be described with reference to flow charts of FIGS. 3A and 3B. Reference symbols $Q_1$ to $Q_{12}$ and $Q_2'$ to $Q_6'$ denote steps in these flow charts.

The operations from step $P_1$ for storing preprocessed isolated characters in the memory 11 to step $P_9$ for ordering the normalized sensor outputs with addresses in the primary recognition judgment processor 19 are performed, as shown in FIGS. 2A and 2B. As shown in step $P_{10}$ in FIG. 2B as well, primary recognition processing is performed (see marks d in FIGS. 2B and 3A). Ordering of the normalized sensor outputs in step $P_9$ actually corresponds to ordering of the character data stored at the corresponding addresses of the look-up table 22. Therefore, in step $P_9$, ordering of primary recognition candidate characters corresponding to that of secondary recognition candidate characters as described later are performed.

Figure 3A:
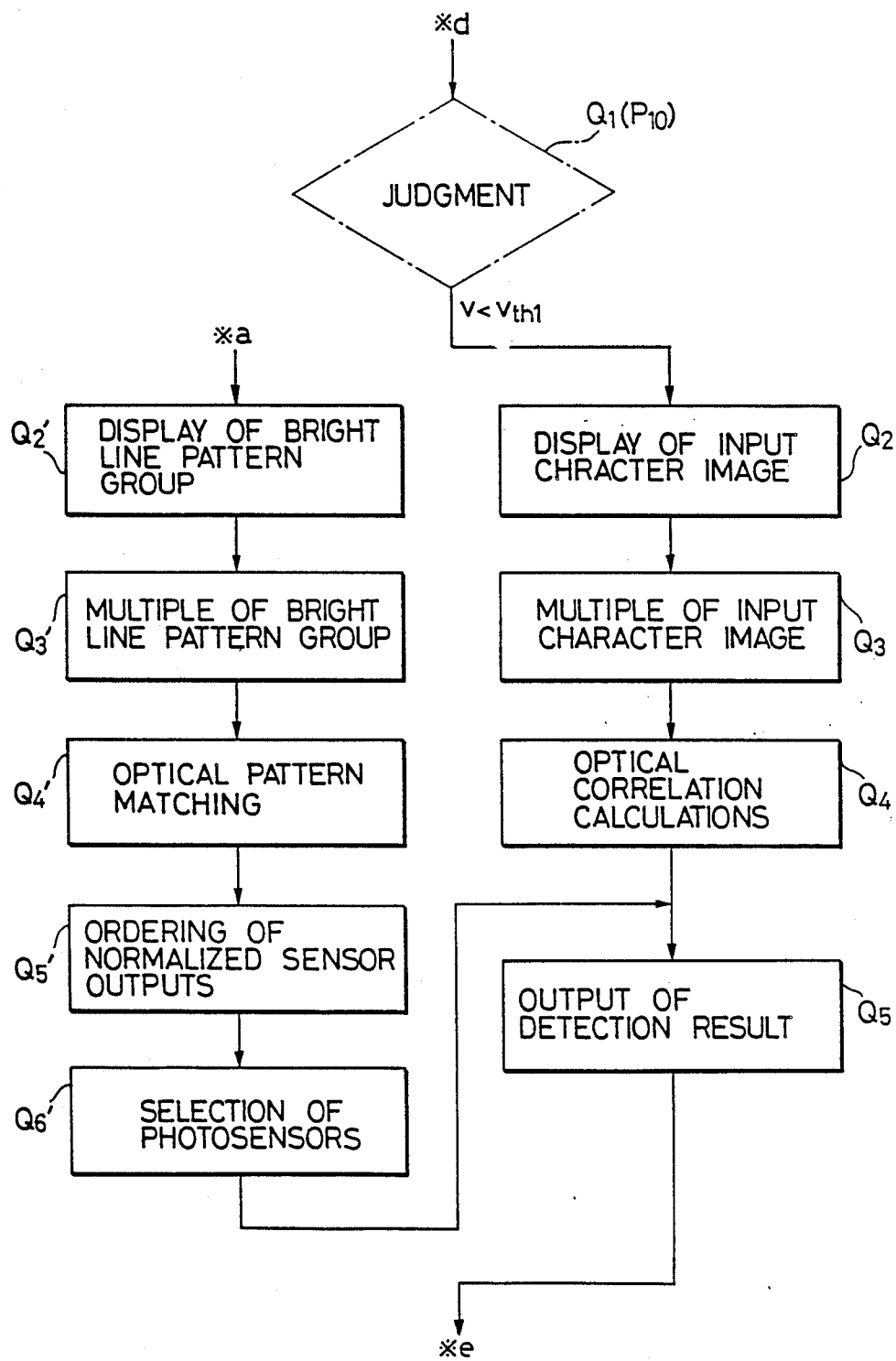
FIG. 3A is a flow chart showing the first half of secondary image recognition processing by the optical image recognizing means.
Figure 3B:
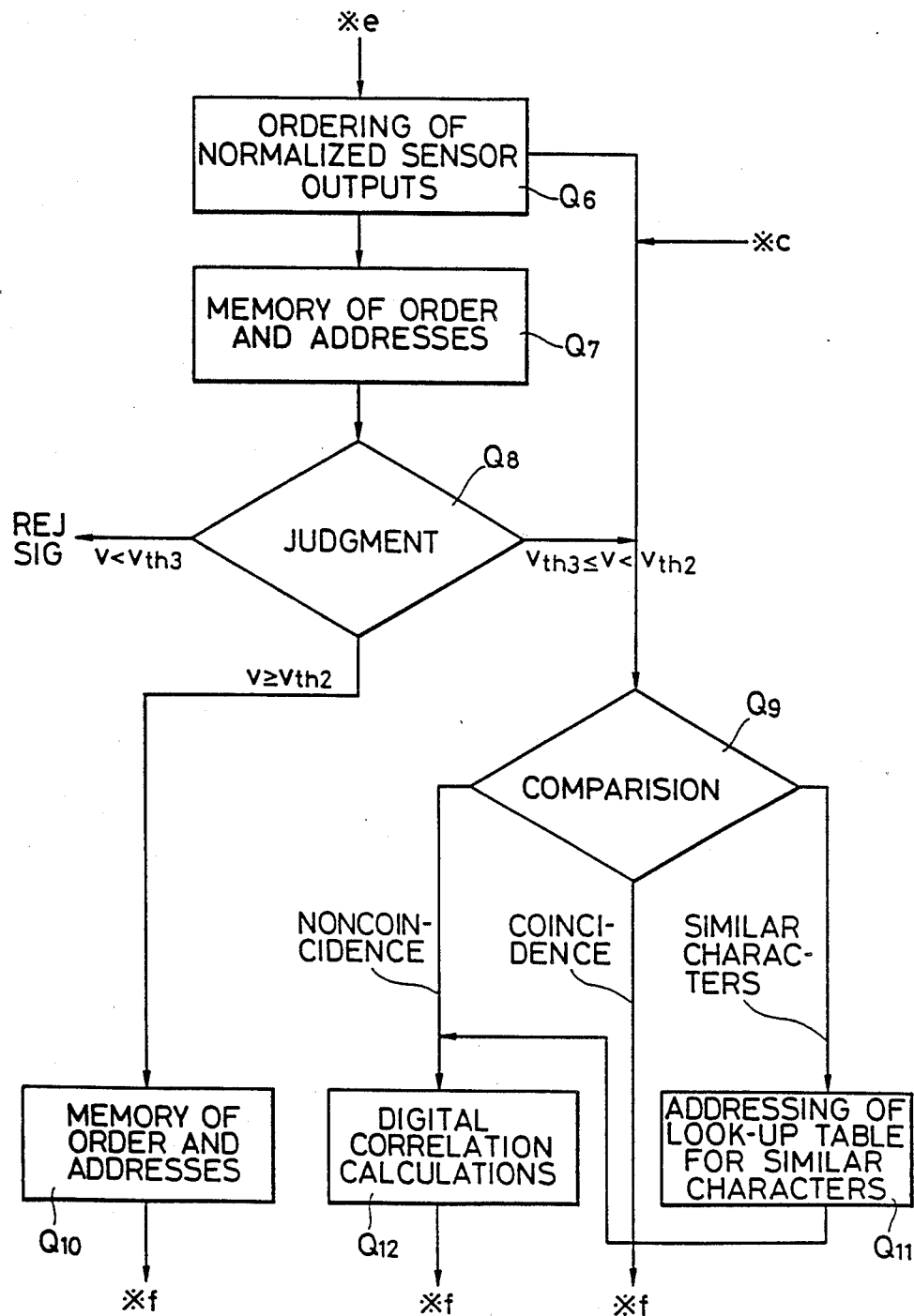
FIG. 3B is a flow chart showing the second half of secondary image recognition processing and supplementary image recognition processing by the optical image recognizing means, and digital correlation calculation processing by an auxiliary digital recognition unit.

In secondary image recognition processing, a high-rank group including the first rank and included in the normalized sensor outputs v ordered as shown in FIG. 3A is judged to be smaller than the recognition judgment threshold value $v_{th1}$ ($Q_1$). This judgment indicates that recognition accuracy of the input character is not satisfactory and therefore final image recognition judgment cannot be made at the present moment.

When the projection calculation unit 12 outputs the projection data of primary recognition processing, the plurality of feature data for rough classification (FIG. 12) are simultaneously supplied to the vector display 61 in the second vector discrimination unit 25, as previously mentioned (marks ✻a in FIGS. 2A and 3A). The plurality of feature data for rough classification respectively constitute vector components of a multi-dimensional vector. The bright line pattern group corresponding to the multi-dimensional vector is displayed on vector display 61 in the same manner that the bright line pattern group is displayed in step $P_5$ ($Q_2'$). The optical image of the bright line pattern group is multiplied by the multiplier 64 consisting of the projection lens 62 and the first lens array 63. Optical pattern images of substantially an identical shape are respectively formed on the plurality of reference masks 65a arranged in front of the first lens array 63 ($Q_3'$). The reference mask 65a may be constituted by, e.g., variable masks. A plurality of reference patterns are formed on the basis of the data transferred from the data base 26 (FIG. 1D) in the same manner as in FIG. 15.

Optical pattern matching between the reference pattern group of the plurality of reference masks 65a and the multiple input images (i.e., the bright line pattern group) formed on the reference mask is performed ($Q_4'$). As a result, lights corresponding to the degree of optical pattern matching are focused by the second lens array 66 and are respectively and simultaneously detected by the plurality of photosensors 67a. The normalized sensor outputs from the photosensors 67a are ordered from the higher to lower outputs ($Q_5'$). The positions of the normalized sensors respectively correspond to the addresses of the characters stored in the look-up table 22. Therefore, the addresses and order of the recognition candidate characters in rough classification can be determined in step $Q_5'$.

In this case, only the photosensors 128a in the second optical correlation calculation unit 27, which correspond to the high-rank group of the candidate characters recognized in step $Q_5'$, are rendered operative (an ON state). The remaining photosensors 128a are rendered inoperative (an OFF state) ($Q_6'$). The above processing is performed before primary recognition character judgment ($Q_1$) is performed.

If $v < v_{th1}$ is judged by the primary recognition judgment processor 19 ($Q_1$), the control signal for performing the secondary recognition is supplied from the processor 19 to the isolated character memory 11. In response to this control signal, the memory 11 is accessed to transfer the data of an input character to be recognized to the second optical correlation calculation unit 27. Therefore, the image of the input character is displayed on the display 121 ($Q_2$).

When the input image is displayed on the display 121, the image of the input character is multiplied by the multiplier 124 consisting of the projection lens 122 and the first lens array 123. The optical pattern images 125a of substantially an identical shape are respectively and simultaneously formed on the image formation planes 125 ($Q_3$).

Next, optical correlation calculations between the multiplied optical pattern images 125a of the input character and the reference patterns of the plurality of reference masks 126a arranged in front of the first lens array 123 are simultaneously performed ($Q_4$). As a result, lights corresponding to the degree of correlation by optical correlation calculations are focused by the second lens array 127 and are simultaneously detected by the photosensors 128a selected in step $Q_6'$ ($Q_5$). The number of outputs from the photosensors 128a is equal to the number of high-rank recognition candidate characters selected by the rough classifying means as previously mentioned and is much smaller than the total number of reference mask data stored in the data base 28.

The normalized sensor outputs v from the photosensors 128a are supplied to the secondary recognition judgment processor 32 (see marks ※e in FIGS. 3A and 3B). Thereafter, the secondary recognition judgment processor 32 causes the normalized sensor output ordering unit 30 to order the normalized sensor outputs ($Q_6$). This ordering is one with addresses of the look-up table 22. Therefore, ordering and addressing of the normalized sensor outputs can be simultaneously performed. After ordering and addressing are completed, the order and addresses of the recognition candidate characters as the secondary recognition candidate characters are temporarily stored in the recognized character address/order memory 20 ($Q_7$).

The recognition judgment threshold value $v_{th2}$ and $v_{th3}$ are set in the output value judgment circuit 31 in the secondary recognition judgment processor 32. Whether there are ordered normalized sensor outputs v which have high recognition accuracy is determined. In other words, whether condition $v \geq v_{th2}$ is established is determined. At the same time, whether condition $v_{th3} \leq v < v_{th2}$ is established is also determined ($Q_8$).

If the ordered normalized sensor outputs v are lower than $v_{th3}$ ($v < v_{th3}$) and then satisfactory recognition accuracy cannot be obtained not only with primary recognition candidate characters but also with secondary recognition candidate characters, a reject signal is output from the output value judgment circuit 31 to the output unit 23 (FIG. 1C).

However, if $v \geq v_{th2}$ is established, the address data of the first-rank normalized sensor outputs of the secondary recognition candidate characters stored in step $Q_7$ are stored in the recognition candidate character order memory 21 ($Q_{10}$). Thereafter, addressing of the look-up table 22 and recognized character generation are performed in the same manner as in the primary image recognition processing (see marks ※f in FIGS. 2B and 3B and steps $P_{12}$ and $P_{13}$ in FIG. 2B).

The character recognition of the above case is shown in the following Table 2. The recognition judgment threshold values are given as $v_{th1}=0.7$, $v_{th2}=0.6$, and $v_{th3}=0.4$. The values suffixed to the first-rank candidate characters are the corresponding normalized sensor output values v. The values are not suffixed to the candidate characters of the second and subsequent ranks. These conditions are identical in Tables 3 to 5.

TABLE 2

| Order | Primary Recognition Candidate Character | Secondary Recognition Candidate Character |
| --- | --- | --- |
| 1 | 化 0.6 | 仁 0.7 |
| 2 | 仁 | 化 |
| 3 | 仕 | 仕 |
| 4 | 化 | 竹 |
| 5 | 仗 | 仕 |

In Table 2, since conditions $v < v_{th1}$ and $v \geq v_{th2}$ are established, Chinese character "仁" is output as a recognized character.

Judgment of $v \geq v_{th3}$ in step $Q_8$ actually indicates the end of secondary image recognition processing of the input character in this condition. For this reason, the secondary recognition judgment processor 32 supplies the address data of the normalized sensor outputs which satisfy condition $v \geq v_{th3}$ to the recognition candidate character order memory 21. At the same time, the processor 32 supplies the control signal representing the end of secondary image recognition processing to the isolated character memory 11 so as to recognize the next input character (see mark ※B in FIG. 1).

If condition $v < v_{th2}$ is established and the normalized sensor output v is close to $v_{th2}$ (satisfying condition $v_{th3} \leq v < v_{th2}$), character decipherment may be possible to perform. However, final recognition judgment is not performed under these conditions ($Q_8$). The address data of the primary and secondary recognition candidate characters are transferred from the recognized character address/order memory 20 to the character order comparison processor 33. The processor 33 compares the both address data each other from the first rank ($Q_9$).

If the address data of at least the first rank coincide with each other, the address data is sent to the recognition candidate character order memory 21. Addressing of the look-up table 22 and a recognized character generation are performed in the same manner as in the primary image recognition processing (see marks ※f in FIGS. 2B and 3B and steps $P_{11}$, $P_{12}$ and $P_{13}$ in FIG. 2B).

The character recognition of the above case (the coincidence of the order) is shown in the following Table 3.

TABLE 3

| Order | Primary Recognition Candidate Character | Secondary Recognition Candidate Character |
| --- | --- | --- |
| 1 | 化 0.6, 仕 0.6, 仁 0.6 | 仁 0.4 |
| 2 | 竹 | 化 |
| 3 | 仗 | 仕 |

In the case shown in Table 3, Chinese character "仁" is output as a recognized character.

In step $Q_9$, if the character order comparison processor 33 judges a noncoincidence (the noncoincidence of the order) of the address data (of the primary and secondary recognition candidate characters) including the first rank thereof, digital correlation calculations are performed by the auxiliary digital recognition unit 35 ($Q_{12}$).

The character data (reference data) corresponding to the high-rank group including at least the address data of the first rank (in primary and secondary image recognition processing) stored in the recognized character address/order memory 20 is supplied from the memory 20 to the auxiliary digital recognition unit 35 through the look-up table 22. At the same time, the input character data stored in the isolated character memory 11 is supplied to the auxiliary digital recognition unit 35.

The character recognition of the above case (the noncoincidence of the order) is shown in the following Table 4.

TABLE 4

| Order | Primary Recognition Candidate Character | Secondary Recognition Candidate Character |
|---|---|---|
| 1 | 化 0.6 | 仁 0.4 |
| 2 | 仁 | 化 |
| 3 | 仕 | 仕 |

In Table 4, data of Chinese character "化" in the first rank of the primary recognition candidate characters and data of Chinese character "仁" in the first rank of the secondary recognition candidate characters are supplied as the candidate characters from the recognized character address/order memory 20 to the auxiliary digital recognition unit 35. At the same time, the input character data is supplied from the isolated character memory 11 to the auxiliary digital recognition unit 35. Thereafter, digital correlation calculations between the input character and the candidate characters are performed ($Q_{12}$). The address data of the character having the highest correlation is sent to the recognition candidate character order memory 21. In the same manner as described above, addressing of the look-up table 22 and recognized character generation are performed in the same manner as described above (see marks ※f in FIGS. 2B and 3B and steps $P_{11}$, $P_{12}$ and $P_{13}$ in FIG. 2B). At the same time, the control signal representing the end of image recognition processing is sent from the auxiliary digital recognition unit 35 to the isolated character memory 11. Therefore, the memory 11 transfers the data of the next input character to the projection calculation unit 12 and the first optical correlation calculation unit 13.

In step $Q_9$, if the character order comparison processor 33 judges that the candidate characters of the first rank in the primary recognition candidate characters and/or the candidate characters of the first rank in the secondary recognition candidate characters have substantially identical sensor outputs and include similar characters, addressing of the look-up table 34 for similar characters is performed ($Q_{11}$).

The recognition of the above case (similar characters) is shown in the following Table 5.

TABLE 5

| Order | Primary Recognition Candidate Character | Secondary Recognition Candidate Character |
|---|---|---|
| 1 | 太 9.0, 大 9.0, 犬 9.0 | 本 0.4, 木 0.4 |
| 2 | 大 | 木 |
| 3 | 木 | 大 |

In the case shown in Table 5, addressing of the look-up table 34 for similar characters is performed for Chinese characters "太", "大" and "犬" of the first rank in the primary recognition candidate characters and Chinese characters "本" and "木" of the first rank in the secondary recognition candidate characters ($Q_{11}$).

Thereafter, similar character data (reference data) accessed from the look-up table 34 for similar characters is sent as the candidate characters to the auxiliary digital recognition unit 35. Thereafter, digital correlation calculations between the input character and the candidate characters are performed ($Q_{12}$). The address data of the character having the highest correlation is sent to the recognition candidate character order memory 21. Addressing of the look-up table 22 and recognized character generation are performed in the same manner as described above (see marks f in FIGS. 2B and 3B and steps $P_{12}$ and $P_{13}$ in FIG. 2B). At the same time, the control signal is supplied from the auxiliary digital recognition unit 35 to the isolated character memory 11 to transfer data of the next input character from the memory 11 in the same manner as described above.

According to the embodiment described above, the projection calculation unit 12, the first optical correlation calculation unit 13 for extracting the primitive patterns as the local features of the input character, and the first vector discrimination unit 14 are used to feature extraction of the input character and pattern matching (analog processing) according to optical simultaneous processing at high speed. The primary recognition judgment processor 19 performs primary image recognition.

If satisfactory recognition accuracy cannot be obtained in primary image recognition processing, the second optical correlation calculation unit 27 is used to perform optical correlation calculations (analog processing) according to optical simultaneous processing at high speed. The secondary recognition judgment processor 32 performs secondary image recognition.

Furthermore, if satisfactory recognition accuracy cannot be obtained by the primary image recognition processing, the secondary image recognition processing, and the supplementary image recognition processing, the auxiliary digital recognition unit 35 is used to perform the digital correlation calculations for the limited recognition candidate characters. Therefore, the high speed of analog processing according to optical techniques is combined with high-precision of digital processing according to the electronic techniques to reinforce their advantages, thereby effectively performing image recognition processing.

In the above embodiment, objects of character recognition processing includes printed (many types such as a Gothic type and a Ming type) and handwritten characters of alphanumeric symbols (e.g., alphabets and Arabic figures), Japanese hiragana characters, Japanese katakana characters, and level 1 and 2 Chinese characters defined in JIS C6226 (Code of the Japanese Graphic Character Set for Information Interchange).

Having described illustrative embodiments of the invention with reference to the accompanying drawings, it is to be understood that the invention is not limited to such precise embodiments, and that various changes and modifications may be effected therein by one skilled in the art without departing from the scope and spirit of the invention as defined in the appended claims.

What is claimed is:

1. An image recognition apparatus comprising, optical image recognizing means for performing image recognition processing including an optical process and electronic image recognizing means for performing electronic digital processing;

said optical image recognizing means being arranged to optically multiply an input image to be recognized to form simultaneously in parallel a plurality of optical pattern images of substantially an identical shape, to simultaneously perform image information detection processing, thereby detecting a plurality of image information data corresponding to the plurality of optical pattern images, and to identify the input image on the basis of the plurality of image information data;

said electronic image recognizing means being arranged to perform digital correlation calculations between digital pattern data representative of the input image and digital pattern data representative of a plurality of reference images and to identify the input image;

said optical image recognizing means comprising;

(b 1) a first optical processing line including projection feature extracting means for extracting projection features of the optical pattern images and primitive pattern extracting means for extracting primitive patterns included in the optical pattern images, simultaneously in parallel with the extraction of said projection features;

(2) a second optical processing line including optical correlation calculating means for performing optical correlation between the optical pattern images and the reference image patterns, independently of and in parallel with said first optical processing line as well as by use of a different reference data base from the reference data base that is used for said first optical processing line; and (3) a third optical processing line for reinforcing functions of said first and second optical processing lines;

said first optical processing line comparing the projection feature data of the input image which are output from said projection character extracting means, and the primitive feature data of the input image which are output from said primitive feature extracting means, respectively with the reference data of the reference images in order to determine the input image;

said second optical processing line being arranged to cause said optical correlation calculating means to perform the optical correlation calculations to determine the input image;

said third optical processing line being arranged such that the image information data from said first optical processing line and the image information data from said second optical processing line are collated and the input image is determined according to a result of the collation; and the digital correlation calculations by said electronic image recognizing means being supplementally performed for limited ones of the reference images according to the image information data obtained by said optical image recognizing means, when the input image cannot be identified by the result of the determination of said third optical processing line.

2. An apparatus according to claim 1, wherein said projection feature extracting means comprises:
   a multiplier for optically multiplying the input image to form a plurality of optical pattern images having a substantially identical shape; and
   a plurality of means for detecting various types of projection features upon detection of projections from the optical images having the substantially identical shape;
   wherein the plurality of optical images having the substantially identical shape and formed by said multiplier are independently supplied to said plurality of detecting means, and various types of projection features are simultaneously produced from said plurality of detecting means.

3. An apparatus according to claim 2, wherein said plurality of detecting means respectively have light-receiving surfaces each constituted as a combination of photosensor units, the combinations of said photosensor units constituting said light-receiving surfaces being different from each other in said detecting means, and
   the plurality of optical images multiplied by said multiplier are respectively formed on said light-receiving surfaces of said plurality of detecting means.

4. An apparatus according to claim 3, wherein at least one of said detecting means comprises a large number of annular photosensor units whose diameters are sequentially changed, said annular photosensor units being adjacent to each other along a radial direction thereof.

5. An apparatus according to claim 3, wherein at least one of said detecting means comprises a large number of substantially sector-shaped photosensor units whose vertices substantially come together at one point such that sides of each of said sector-shaped photosensor units are adjacent to those of an adjacent one thereof.

6. An apparatus according to claim 1, wherein said optical correlation calculating means comprises:
   a multiplier for optically multiplying the input image to form a plurality of optical pattern images having a substantially identical shape;
   a plurality of reference masks respectively having reference patterns to be pattern-matched with the optical pattern images, said plurality of reference masks being adapted to respectively receive the plurality of optical pattern images; and
   photodetecting means for detecting beams emitted through said plurality of reference masks upon pattern matching between the optical pattern images and the reference patterns.

7. An apparatus according to claim 6, wherein the reference patterns formed on said reference masks have predetermined shapes which cannot be changed into other shapes.

8. An apparatus according to claim 6, wherein said reference patterns formed on said reference masks are respectively constituted by spatial modulation elements, the reference patterns constituted by said spatial modulation elements being changed in response to reference data transferred from a data base.

9. An apparatus according to claim 1, wherein
   said primitive image recognizing means respectively compares the projection feature data of the input image which are output from said projection character extracting means, and the primitive feature data of the input image which are output from said primitive feature extracting means, with the reference data of the reference images in order to identify the input image.

10. An apparatus according to claim 9, wherein said primitive pattern extracting means comprises:
    a multiplier for optically multiplying the input image to form a plurality of optical pattern images having substantially an identical shape;
    a plurality of primitive masks respectively having various types of primitive patterns respectively consisting of basic shapes commonly included in a plurality of input images, said plurality of primitive masks being adapted to respectively receive the plurality of optical pattern images corresponding to the various types of primitive patterns; and
    photodetecting means for detecting beams emitted through said plurality of primitive masks upon optical comparison between the optical pattern images and the primitive patterns.

11. An apparatus according to claim 10, wherein said primitive patterns formed on said primitive masks have predetermined shapes which cannot be changed to other shapes.

12. An apparatus according to claim 10, wherein said primitive patterns formed on said primitive masks are respectively constituted by spatial modulation elements, and the primitive patterns constituted by said spatial modulation elements can be changed in response to reference data transferred from a data base.

13. An apparatus according to claim 1, wherein said optical image recognizing means comprises vector discriminating means for discriminating a vector which corresponds to at least one projection feature derived from the input image and which is constituted by a plurality of vector components, said vector discriminating means comprising:
a display for displaying a plurality of optical patterns at positions respectively corresponding to sizes of the plurality of vector components;
a plurality of reference masks each having a reference pattern corresponding to the reference images in order to perform optical pattern matching with an optical pattern group consisting of the plurality of optical patterns;
a multiplier for optically multiplying the optical pattern group displayed on said display to form a plurality of optical pattern groups each having a substantially identical shape in the vicinities of said plurality of reference masks; and
light detecting means for optically detecting beams emitted respectively through said plurality of reference masks by matching the optical pattern group with the reference pattern group.

14. An apparatus according to claim 13, wherein the reference patterns formed on said reference masks have predetermined shapes which cannot be changed to other shapes.

15. An apparatus according to claim 13, wherein said reference patterns formed on said reference masks are respectively constituted by spatial modulation elements, and the reference patterns constituted by said spatial modulation elements can be changed in correspondence to reference data transferred from a data base.

16. An apparatus according to claims 14 or 15, wherein the reference patterns are constituted as a gray scale.

17. An apparatus according to claim 1, wherein at least one type of projection feature of the input image which is output from said projection feature extracting means is compared with the reference data, and said optical correlation calculating means performs optical correlation calculations for the reference images, the number of which is limited by a comparison result.

18. An apparatus according to claim 1, wherein said second optical processing line is operative when said first optical processing line cannot identify the input image.

19. An apparatus according to claim 1, wherein said third optical processing line is arranged such that a degree of similarity between the image information data from said first optical processing line and the image information data from said second optical processing line is detected and the input image is identified according to a detection result of the degree of similarity.

* * * * *